(12) United States Patent
Pranger et al.

(10) Patent No.: US 10,771,738 B2
(45) Date of Patent: *Sep. 8, 2020

(54) METHODS AND SYSTEMS FOR MULTI-PANE VIDEO COMMUNICATIONS

(71) Applicant: ALEXANDER MACKENZIE & PRANGER, Sandy, UT (US)

(72) Inventors: Eugene Patrick Pranger, Alpine, UT (US); Timothy Eugene Pranger, Eagle Mountain, UT (US); Robert Eric Roy, Riverton, UT (US)

(73) Assignee: POPIO IP HOLDINGS, LLC, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,037

(22) Filed: Aug. 28, 2018

(65) Prior Publication Data

US 2018/0367755 A1   Dec. 20, 2018

Related U.S. Application Data

(63) Continuation of application No. 15/498,290, filed on Apr. 26, 2017, now Pat. No. 10,091,459, which is a
(Continued)

(51) Int. Cl.
*H04N 7/14* (2006.01)
*G06F 3/0484* (2013.01)
(Continued)

(52) U.S. Cl.
CPC ......... *H04N 7/147* (2013.01); *G06F 3/04842* (2013.01); *G06F 3/1446* (2013.01);
(Continued)

(58) Field of Classification Search
USPC ........................................ 455/416
See application file for complete search history.

(56) References Cited

U.S. PATENT DOCUMENTS

| D619,593 | S | 7/2010 | Fujioka et al. |
| 7,812,988 | B2 | 10/2010 | Doo |

(Continued)

FOREIGN PATENT DOCUMENTS

| EP | 2833595 A1 | 2/2015 |
| WO | WO 2017/180226 | 10/2017 |

OTHER PUBLICATIONS

International Search Report & Written Opinion as received in PCTUS2017-016584 dated Apr. 25, 2017.
(Continued)

*Primary Examiner* — Maria El-Zoob
(74) *Attorney, Agent, or Firm* — Keller Jolley Preece

(57) ABSTRACT

Systems and methods are disclosed for establishing a video connection between a mobile device and a support terminal while enabling the support terminal to concurrently push display elements to the mobile device through a separate connection. In particular, in one or more embodiments, the disclosed systems and methods establish a first connection between the support terminal and the mobile device and conduct a video chat between the devices transmitted through the first connection. The disclosed systems and methods enable the support terminal to push a display element to the mobile device through a second connection. In response to receiving the display element, the disclosed systems and methods divide the display screen of the mobile device into at least a first pane and a second pane, providing the video chat for display on the first pane and the display element for display on the second pane.

20 Claims, 15 Drawing Sheets

Related U.S. Application Data continuation of application No. 15/208,576, filed on Jul. 12, 2016, now Pat. No. 9,699,406, which is a continuation of application No. 29/561,280, filed on Apr. 14, 2016, now Pat. No. Des. 845,972.

(51) Int. Cl.
| | | |
|---|---|---|
| *H04N 5/232* | (2006.01) | |
| *G06Q 40/02* | (2012.01) | |
| *G06F 3/14* | (2006.01) | |
| *G06Q 20/04* | (2012.01) | |
| *G06Q 20/32* | (2012.01) | |
| *H04L 29/06* | (2006.01) | |
| *H04N 5/265* | (2006.01) | |
| *H04N 7/08* | (2006.01) | |

(52) U.S. Cl.
CPC ....... *G06Q 20/042* (2013.01); *G06Q 20/3223* (2013.01); *G06Q 40/02* (2013.01); *H04L 65/1069* (2013.01); *H04N 5/23293* (2013.01); *H04N 5/265* (2013.01); *H04N 7/08* (2013.01)

(56) References Cited

U.S. PATENT DOCUMENTS

| | | | |
|---|---|---|---|
| 8,117,562 | B2 | 2/2012 | Getsch |
| D670,716 | S | 11/2012 | Majeed et al. |
| 8,433,650 | B1 | 4/2013 | Thomas |
| D700,912 | S | 3/2014 | Kim |
| 8,782,043 | B2 | 7/2014 | Chisholm et al. |
| 8,789,094 | B1 * | 7/2014 | Singh ............... H04L 65/1069 725/37 |
| 8,890,685 | B1 | 11/2014 | Sookman et al. |
| 8,924,465 | B1 | 12/2014 | Tunguz-Zawislak |
| 8,955,743 | B1 | 2/2015 | Block et al. |
| D725,133 | S | 3/2015 | Smirin et al. |
| D725,665 | S | 3/2015 | Tseng et al. |
| D726,736 | S | 4/2015 | Smirin et al. |
| D739,867 | S | 9/2015 | Faria et al. |
| D747,733 | S | 1/2016 | Scalisi |
| 9,245,100 | B2 | 1/2016 | Marco et al. |
| D755,812 | S | 5/2016 | Lim |
| D759,662 | S | 6/2016 | Panjabi |
| D760,259 | S | 6/2016 | Watson |
| D762,231 | S | 7/2016 | Pearson |
| D762,676 | S | 8/2016 | Lim |
| D762,686 | S | 8/2016 | Lee et al. |
| D763,872 | S | 8/2016 | Tussy |
| D765,683 | S | 9/2016 | Peng |
| D767,601 | S | 9/2016 | Zhou |
| D768,148 | S | 10/2016 | Jung et al. |
| D769,921 | S | 10/2016 | Smith |
| D770,487 | S | 11/2016 | Li |
| D770,488 | S | 11/2016 | Li |
| D774,061 | S | 12/2016 | Wu |
| D776,147 | S | 1/2017 | Simmons et al. |
| D777,733 | S | 1/2017 | Loosli et al. |
| D779,540 | S | 2/2017 | Rad et al. |
| D780,787 | S | 3/2017 | Gomez |
| D781,311 | S | 3/2017 | Rad et al. |
| D781,874 | S | 3/2017 | Dunn |
| D789,389 | S | 6/2017 | Kim et al. |
| D789,395 | S | 6/2017 | Weeresinghe |
| D789,956 | S | 6/2017 | Ortega et al. |
| D790,578 | S | 6/2017 | Hatzikostas |
| 9,699,406 | B1 | 7/2017 | Pranger et al. |
| D793,427 | S | 8/2017 | Sun |
| D797,118 | S | 9/2017 | Van Every et al. |
| D803,851 | S | 11/2017 | Vazquez |
| 9,820,085 | B1 | 11/2017 | Telang et al. |
| D845,972 | S | 4/2019 | Pranger et al. |
| 10,402,790 | B1 | 9/2019 | Clark et al. |
| 2005/0149630 | A1 | 7/2005 | Smolinski et al. |
| 2006/0114315 | A1 | 6/2006 | Crook |
| 2006/0152594 | A1 | 7/2006 | Landschaft et al. |
| 2007/0067267 | A1 | 3/2007 | Ives |
| 2007/0093241 | A1 | 4/2007 | Oh et al. |
| 2008/0075067 | A1 | 3/2008 | Guglielmi et al. |
| 2009/0313167 | A1 | 12/2009 | Dujari et al. |
| 2010/0053302 | A1 * | 3/2010 | Ivashin ............... H04N 7/147 348/14.08 |
| 2010/0073454 | A1 * | 3/2010 | Lovhaugen ........... H04N 7/147 348/14.03 |
| 2011/0106671 | A1 | 5/2011 | Minnis et al. |
| 2011/0249073 | A1 * | 10/2011 | Cranfill ............... H04N 5/2258 348/14.02 |
| 2012/0017149 | A1 | 1/2012 | Lai et al. |
| 2012/0030741 | A1 | 2/2012 | Chai et al. |
| 2012/0079419 | A1 | 3/2012 | Ajitomi et al. |
| 2012/0251985 | A1 | 10/2012 | Steels et al. |
| 2012/0296747 | A1 | 11/2012 | Triola |
| 2013/0013499 | A1 * | 1/2013 | Kalgi ............... G06Q 20/34 705/41 |
| 2013/0083066 | A1 | 4/2013 | Aoki et al. |
| 2013/0203345 | A1 | 8/2013 | Fisher |
| 2013/0297353 | A1 | 11/2013 | Strange et al. |
| 2014/0022328 | A1 | 1/2014 | Gechter et al. |
| 2014/0051402 | A1 | 2/2014 | Qureshi |
| 2014/0063174 | A1 | 3/2014 | Junuzovic et al. |
| 2014/0106721 | A1 * | 4/2014 | Calman ............... H04L 12/1818 455/416 |
| 2014/0214967 | A1 | 7/2014 | Baba et al. |
| 2015/0026351 | A1 * | 1/2015 | Calman ............... H04L 65/1083 709/227 |
| 2015/0149536 | A1 | 5/2015 | Nishikawa et al. |
| 2015/0149565 | A1 | 5/2015 | Ahmed |
| 2015/0227298 | A1 | 8/2015 | Kim et al. |
| 2015/0234636 | A1 | 8/2015 | Barnes |
| 2015/0256695 | A1 | 9/2015 | Showering et al. |
| 2015/0304196 | A1 | 10/2015 | Sun et al. |
| 2015/0326729 | A1 | 11/2015 | Paolini-Subramanya |
| 2015/0334344 | A1 | 11/2015 | Shoemake |
| 2015/0350446 | A1 | 12/2015 | Glass et al. |
| 2016/0006817 | A1 | 1/2016 | Mitic et al. |
| 2016/0100298 | A1 | 4/2016 | Peterson |
| 2016/0104122 | A1 * | 4/2016 | Mande ............... G06Q 10/1095 705/7.19 |
| 2016/0132847 | A1 | 5/2016 | Sarris |
| 2016/0192308 | A1 | 6/2016 | Turney et al. |
| 2016/0212255 | A1 | 7/2016 | Lee et al. |
| 2016/0224210 | A1 | 8/2016 | Moore et al. |
| 2016/0300030 | A1 | 10/2016 | Vann et al. |
| 2016/0337424 | A1 | 11/2016 | Mandyam |
| 2016/0378744 | A1 | 12/2016 | XiangLi et al. |
| 2017/0017635 | A1 | 1/2017 | Leliwa et al. |
| 2017/0140504 | A1 | 5/2017 | Jeong et al. |
| 2017/0150223 | A9 | 5/2017 | Zaccone et al. |
| 2017/0171700 | A1 | 6/2017 | Sabarez et al. |
| 2017/0270079 | A1 | 9/2017 | Rajwat et al. |
| 2017/0302884 | A1 | 10/2017 | Pranger et al. |
| 2017/0313262 | A1 | 11/2017 | Wisnia et al. |
| 2017/0366353 | A1 | 12/2017 | Struttmann |
| 2017/0368413 | A1 | 12/2017 | Shavit |
| 2018/0012432 | A1 | 1/2018 | Shin et al. |
| 2018/0018396 | A1 | 1/2018 | Roundtree et al. |
| 2018/0018838 | A1 | 1/2018 | Fankhauser et al. |
| 2018/0035074 | A1 | 2/2018 | Barnes |
| 2018/0048864 | A1 | 2/2018 | Taylor et al. |
| 2018/0048865 | A1 | 2/2018 | Taylor et al. |
| 2018/0054446 | A1 | 2/2018 | Modras |
| 2018/0103341 | A1 | 4/2018 | Moiyallah et al. |
| 2018/0104573 | A1 | 4/2018 | Jeffery et al. |
| 2018/0176272 | A1 | 6/2018 | Zur et al. |
| 2019/0052840 | A1 | 2/2019 | Taylor et al. |

OTHER PUBLICATIONS

U.S. Appl. No. 29/561,280, dated Jan. 24, 2018, Restriction Requirement.
U.S. Appl. No. 29/561,280, dated Aug. 14, 2018, Office Action.
U.S. Appl. No. 15/208,576, dated Nov. 30, 2016, Office Action.
U.S. Appl. No. 15/208,576, dated Feb. 16, 2017, Office Action.

(56) References Cited

OTHER PUBLICATIONS

U.S. Appl. No. 15/208,576, dated May 8, 2017, Office Action.
U.S. Appl. No. 15/208,576, dated May 24, 2017, Notice of Allowance.
U.S. Appl. No. 15/498,290, dated Oct. 19, 2017, Office Action.
U.S. Appl. No. 15/498,290, dated Mar. 21, 2018, Office Action.
U.S. Appl. No. 15/498,290, dated Jul. 18, 2018, Notice of Allowance.
U.S. Appl. No. 15/498,290, dated Aug. 24, 2018, Notice of Allowance.
U.S. Appl. No. 15/792,040, dated Apr. 26, 2018, Office Action.
U.S. Appl. No. 15/793,806, dated May 9, 2018, Office Action.
U.S. Appl. No. 15/792,040, dated Sep. 11, 2018, Office Action.
U.S. Appl. No. 15/792,040, dated Nov. 9, 2018, Notice of Allowance.
U.S. Appl. No. 15/793,806, dated Sep. 13, 2018, Office Action.
U.S. Appl. No. 15/793,806, dated Nov. 9, 2018, Notice of Allowance.
U.S. Appl. No. 16/160,379, dated May 24, 2019, Office Action.
U.S. Appl. No. 29/561,280, dated Feb. 6, 2019, Notice of Allowance.
U.S. Appl. No. 16/160,379, dated Oct. 3, 2019, Notice of Allowance.
U.S. Appl. No. 16/592,587, dated Apr. 21, 2020, Office Action.

\* cited by examiner

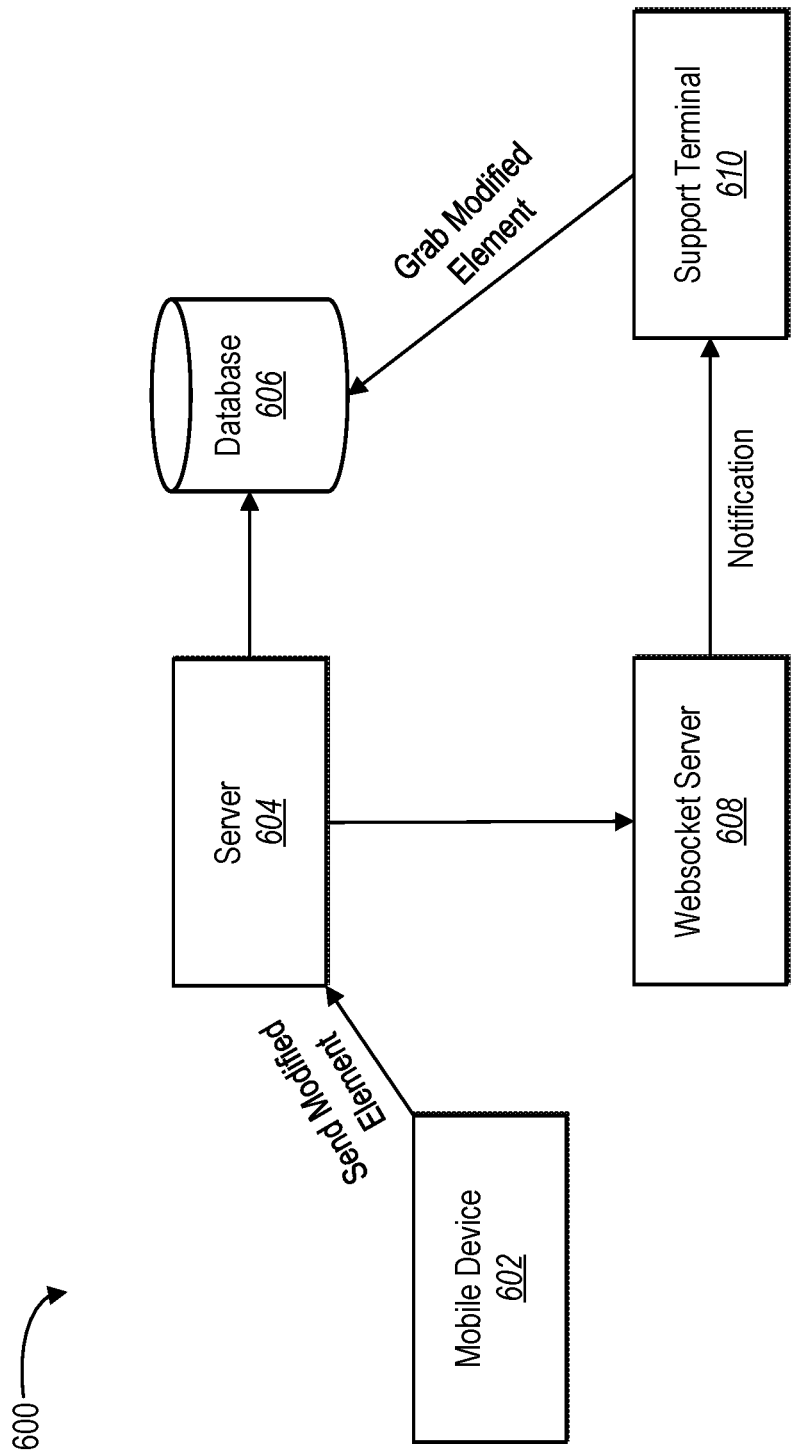

METHODS AND SYSTEMS FOR MULTI-PANE VIDEO COMMUNICATIONS

CROSS-REFERENCE TO RELATED APPLICATIONS

The present application is a continuation of U.S. patent application Ser. No. 15/498,290, filed Apr. 26, 2017, which is a continuation of U.S. patent application Ser. No. 15/208,576, filed on Jul. 12, 2016, now issued as U.S. Pat. No. 9,699,406, which is a continuation-in-part of U.S. patent application Ser. No. 29/561,280, filed on Apr. 14, 2016. Each of the aforementioned applications are hereby incorporated by reference in their entirety.

BACKGROUND

Many modern businesses create mobile applications meant to improve accessibility to the business and allow a user to perform some desired function or access information on a mobile device. Some businesses, such as game developers, do business solely through the application itself. Other businesses, such as banks, may create a mobile application merely to provide customers a convenient alternative to visiting a brick and mortar branch of the business.

A frequent problem arises when a user does not know how to perform a desired function or access information on the business's mobile application. New users and users not familiar with technology often run experience frustration when using mobile applications. This frustration may lead a user to abandon the mobile application and, possibly, the business-customer relationship altogether.

More specifically, problems associated with current mobile application technology that commonly add to a user's frustration include a lack of interpersonal communication between the user and a representative of the business. Because a mobile application may generally substitute for face-to-face interaction, a user may have little interaction with any people associated with the business, leading to disconnect between the user and the business. This disconnect can weaken the business-customer relationship.

Additional problems include the continued need for the user to be the principal navigator of the application. Though a user may seek assistance from a customer support representative in interacting with the application, the support representative is generally limited to orally providing instructions to the user. As a result, any rendered assistance fails to alleviate the burden of navigating the application from the user. If the user doesn't understand or cannot follow the instructions, frustration results.

Prior attempts to improve a user's experience have included tutorial slide shows or videos, help documents, guided tours of the site or application, or other similar attempts to familiarize the user with the offered functionality. These solutions, however, typically do not cover every function offered, overload the user with too much information at once, or offer a predetermined explanation with no elaboration if the user does not understand.

Other solutions, such as telephone support, requires the user to either use multiple devices to follow the representative's instructions while on the phone or to write down or memorize the instructions and perform them after the conversation has ended. This limits a user to seeking support only where multiple devices or writing materials are available. For example, often a user may be trying to use a mobile application on their mobile phone. Many mobile phones do not allow a user to talk on a phone call and navigate a mobile application at the same time. Thus, a phone call many not be sufficient to resolve the user's concerns.

Users may attempt to perform a video call or text chat session to obtain help with a mobile application. Again, some devices do not allow for simultaneous video chats and navigation of a mobile application. Furthermore, even if the devices allow for both, the use of two separate applications (the mobile application and a video chat application) require switching back and forth between the video call application and the mobile application, require large amounts of processing power to run both applications, or otherwise lead to a degraded experience.

SUMMARY

One or more embodiments described herein provide benefits and/or solve one or more of the foregoing or other problems in the art with systems and methods for establishing a video connection between a mobile device and a support terminal while also allowing the support terminal to push display elements through a separate connection to the mobile device. In particular, establishing a separate connection providing bidirectional capabilities between the mobile device and support terminal allows the support terminal to push elements directly to the mobile device while maintaining the video connection. Thus, rather than requiring a user of an application on the mobile device to navigate the application to find the display elements, the support terminal pushes these elements directly to the mobile device. In effect, the systems and methods allow a support terminal to remotely control the display of such elements on the mobile device.

Additionally, when the mobile device receives a display element, instructions stored on the mobile device execute, dividing the display of the mobile device into at least a first pane and a second pane. The first pane displays a video chat session and the second pane displays the display element. Thus, the user of the mobile device is able to maintain interpersonal communication with a user of the support terminal while reviewing and/or interacting with the display element/mobile application. In this way, a user of the mobile application is spared the hassle of using multiple devices or memorizing instructions when seeking help in navigating and using the application.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 6 illustrates an example implementation of a communications system used to send a modified display element. in accordance with one or more embodiments;

DETAILED DESCRIPTION

Figure 1:
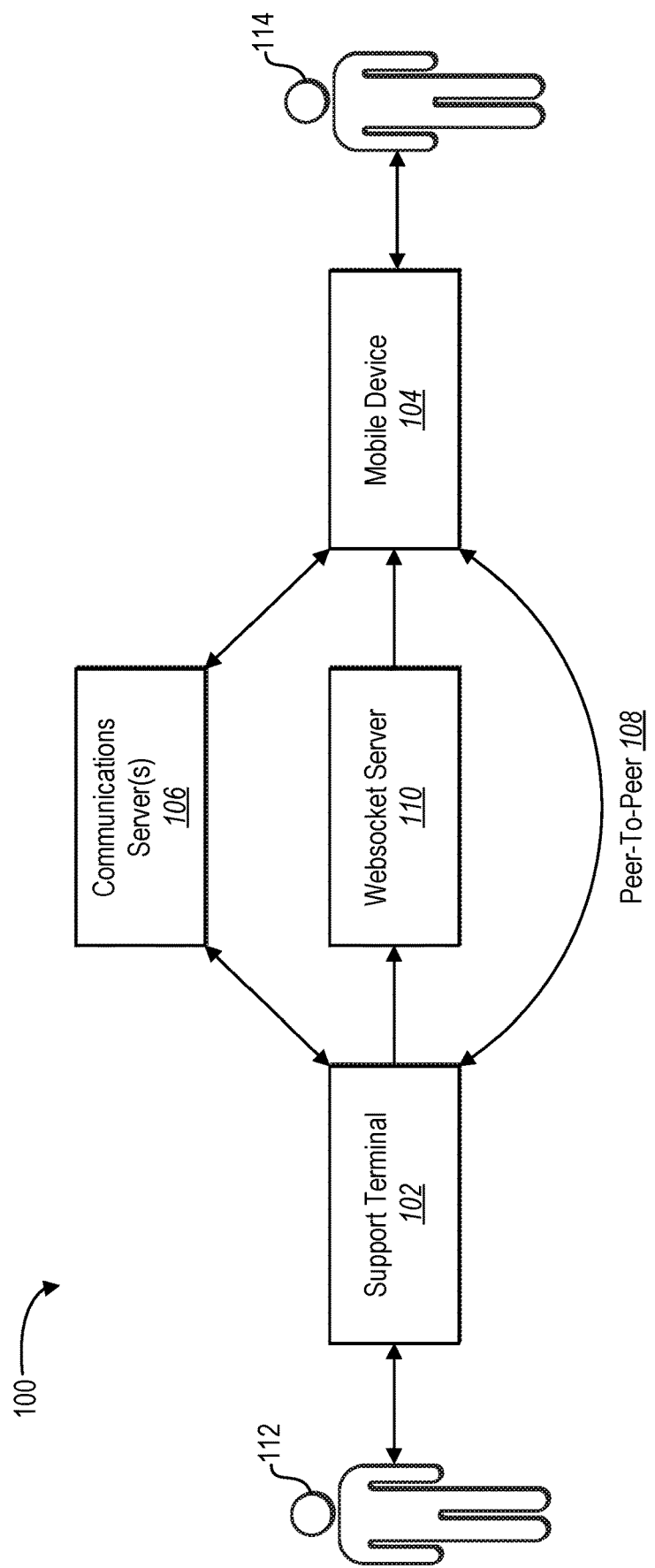
FIG. 1 illustrates a schematic diagram of a communications system in accordance with one or more embodiments.

One or more embodiments described herein include a communications system that enables a single mobile application to use multiple communication connections with a support terminal to provide a video chat while concurrently providing a display element pushed to the mobile device by the support terminal. To illustrate, a user of the mobile device accesses the communications system via the mobile application. In one or more embodiments, a user interface of the mobile application provides a selectable option to request assistance from a support representative via video chat. In response to the user request, the communications system establishes a video chat session between the mobile device and the support terminal. The video chat allows the user to communicate with a support representative using the support terminal and seek help in interacting with the mobile application.

During the video chat session, the communications system enables the support representative to assist by allowing the support terminal to push a display element to the mobile device. A display element may contain information to be viewed or a function to be performed at the mobile device. For example, the display element can comprise a video providing information about a particular service. Alternatively, the display element may contain an interactive feature, such as a fillable form. In one or more embodiments, the communications system provides the display element on the mobile device while concurrently providing the video chat via a multi-pane display of the single mobile application. In this way, the user may receive further assistance while reviewing or interacting with the display element.

More particularly, the communications system initiates a video chat session by establishing a first connection between a mobile device and a support terminal. Once established, the communications system conducts a video chat transmitted through the first connection and provides the video chat for display to both the support terminal and the mobile device. A user of the mobile device and a support representative using the support terminal may then communicate with one another.

Additionally, one or more embodiments of the communications system enable the support terminal to push a display element to the mobile device. For example, in at least one embodiment, the support terminal selects a display element from a set of selectable display elements stored on the support terminal and subsequently pushes the display element to the mobile device. The communications system may transmit the display element to the mobile device through a second connection. For example, the communication system uses a second connection, separate from the first connection to send the display element. One will appreciate in light of the disclosure herein that the use of a separate connection allows the support terminal to push the display element, uses less computing resources, and avoids degrading the video chat.

In response to the mobile device receiving the display element, the mobile application divides a display of the mobile device into multiple panes (e.g., two or more panes). In at least one embodiment, the mobile application divides the display into at least a first pane and a second pane. The communications system then provides the video chat in the first pane while concurrently providing the display element in the second pane.

By concurrently providing a video chat and a display element, the communications system enables a support representative to more effectively guide a user of a mobile device through the entire process of interacting with a mobile application. In this way, the user avoids navigating an unfamiliar mobile application and, as a result, avoids possible frustration. Additionally, by using a connection that provides bidirectional communication, the support terminal provides the information or function directly to the mobile device. Bidirectional communication gives the communications system advantages over a more traditional system in which a client device polls a server for data. In such traditional systems, a server may not initiate communication with a mobile device, but may only respond to a request. Using a bidirectional connection, the communications system allows the support terminal to immediately provide an available display element to the mobile device, rather than wait for a request. Thus, one or more embodiments provide for quicker processing/sending of display elements to a mobile device.

Further, the mobile device displays the video chat and the display element concurrently using the same mobile application, and thus, requires fewer computer resources than a conventional system—such as memory, processing power, and display space—thus allowing a limited set of computer resources to perform functions faster than before. In particular, a user need not have a separate video chat application running together with the mobile application.

Though the discussion herein includes implementations of the methods and systems in the context of a mobile banking application, it will be appreciated that this context is merely illustrative and that the uses of the methods and systems described extend beyond a banking application to other non-banking mobile applications.

FIG. 1 illustrates an example implementation of a communications system 100 (or simply "system 100"). As illustrated in FIG. 1, the system 100 comprises a support terminal 102, a mobile device 104, communication server(s) 106, a peer-to-peer connection 108, and a Websocket server 110. As is also illustrated in FIG. 1, a support representative 112 and a mobile device user 114 may interact with the support terminal 102 and the mobile device 104 respectively in order to access content on the respective devices and communicate with one another.

As shown in FIG. 1, the system 100 includes the support terminal 102. The support terminal 102 may comprise a computing device, such as those described below in relation to FIG. 10. For example, the support terminal 102 may comprise one or more personal computers, laptop computers, mobile devices, mobile phones, tablets, special purpose computers, televisions, or other computing devices.

The mobile device 104 may comprise any mobile computing device, such as those described below in relation to FIG. 10. In one or more embodiments, the mobile device 104 includes a handheld client device. As used herein the term "handheld device" refers to a device sized and configured to be held/operated in a single hand of a user. For example, the mobile device 104 can include a smartphone, a tablet computing device, or other mobile computing device.

Additionally, the system 100 also includes the communications server(s) 106. The communications server(s) 106 may store, receive, and transmit any type of data, including a display element, a video data, or a video chat request. For example, the communications server(s) 106 may receive and transmit a request for a video chat from the mobile device 104 to the support terminal 102. The communications server(s) 106 can also transmit video data between one or more devices, such as the support terminal 102 and the mobile device 104.

As illustrated, the communications server(s) 106 serves to establish a connection between the support terminal 102 and the mobile device 104. For example, the communications server(s) 106 may establish a connection in response to a video chat request sent by the mobile device 104. In particular, the communications server(s) 106 establish the connection to allow transmission of a video chat between the support terminal 102 and the mobile device 104. For example, once the communications server(s) 106 establishes the connection, the system 100 conducts a video chat between the support terminal 102 and the mobile device 104 through the connection. The support representative 112 and the mobile device user 114 may interact with the support terminal 102 and the mobile device 104 respectively to communicate with one another via the video chat.

As illustrated, in one or more embodiments, the communication server(s) 106 comprises one server. Alternatively, the communications server(s) 106 may comprise a series of servers. For example, the communications server(s) 106 may comprise a video load balance server, a signaling server, and a STUN/TURN server. The video load balance server serves to direct communications to an available support terminal, the signaling server notifies the available support terminal of a video chat request, and the STUN/TURN server serves to work through secure firewalls to establish the connection. Alternatively, any other combinations and types of servers sufficient to establish a connection may be used as part of the communication server(s) 106.

As illustrated, the system 100 also includes the peer-to-peer connection 108. The peer-to-peer connection 108 serves as a direct connection between the support terminal 102 and the mobile device 104. In one or more embodiments, the peer-to-peer connection 108 may serve to substitute the communication(s) servers 106. In particular, after the communication(s) server 106 establishes the connection between the support terminal 102 and the mobile device 104, the system 100 may subsequently establish the peer-to-peer connection 108 and conduct the video chat over the peer-to-peer connection. As used herein, a peer-to-peer (P2P) connection is created when two or more client computing devices are connected and share resources without going through a separate server computing device (like the communication server(s) 106).

The peer-to-peer connection 108 can provide a solution to bandwidth limitations that restrict the maximum number of concurrent video streams possible through the communication server(s) 106. The peer-to-peer connections, where possible, maximize the number of possible simultaneous video calls.

In one or more embodiments, the communication server (s) 106 may first determine if the peer-to-peer connection 108 is available. For example, the peer-to-peer connection 108 may be unavailable due to limitations or the configuration of the hardware or software within the system 100. For example, video relays between client devices on restrictive networks and firewalls are often blocked. Network address translation limits the client device's ability to have peer-to-peer connections. In one or more embodiments, the system detects when a peer-to-peer connection is not possible. If the communication server(s) 106 determines that the peer-to-peer connection 108 is not available, then the communications server(s) 106 may maintain (or reroute) the connection for the video chat via the communication servers (s) 106. In an alternative embodiment, the communications server(s) 106 may maintain the first connection whether or not the peer-to-peer connection 108 is available.

As is also illustrated in FIG. 1, the system 100 may also include the Websocket server 110. The Websocket server 110 may generate, store, receive, and transmit any type of data, including a display element (not shown). For example, the Websocket server 110 may receive and push a display element sent from the support terminal 102 to the mobile device 104.

As FIG. 1 illustrates, the Websocket server 110 provides a second connection between the support terminal 102 and the mobile device 104. In particular, the Websocket server 110 provides a bidirectional connection, also known as a full-duplex connection, enabling support terminal 102 to push data to the mobile device 104, rather than requiring support terminal 102 to wait for a request from the mobile device 104, as is done in some traditional client/server systems. Though FIG. 1 illustrates an embodiment where the second connection is established through a Websocket server 110, one with ordinary skill in the art will appreciate that any type of server or device that enables the support terminal 102 to push a display element to the mobile device 104 can be used as a substitute for the Websocket server 110.

FIG. 1 further illustrates an embodiment where the second connection is a persistent connection, consistently maintained by the Websocket server 110 after it has been established. A persistent second connection may be established before, after, or at the same time the first connection is established. One or more embodiments of the system 100 may wait until the support terminal 102 initiates transmission of a first display element before it establishes the second connection through the Websocket server 110. As an alternative to a persistent second connection, the system 100 may create the second connection through the Websocket server 106 only when required to transmit a data from the support terminal 102 to the mobile device 104. In this alternative embodiment, system 100 may wait until the support terminal 102 initiates transmission of data to the mobile device 104. When the transmission is initiated, the system 100 then creates the second connection through the Websocket server 106, waits until the transmission terminates, and then severs the second connection.

Figure 2:
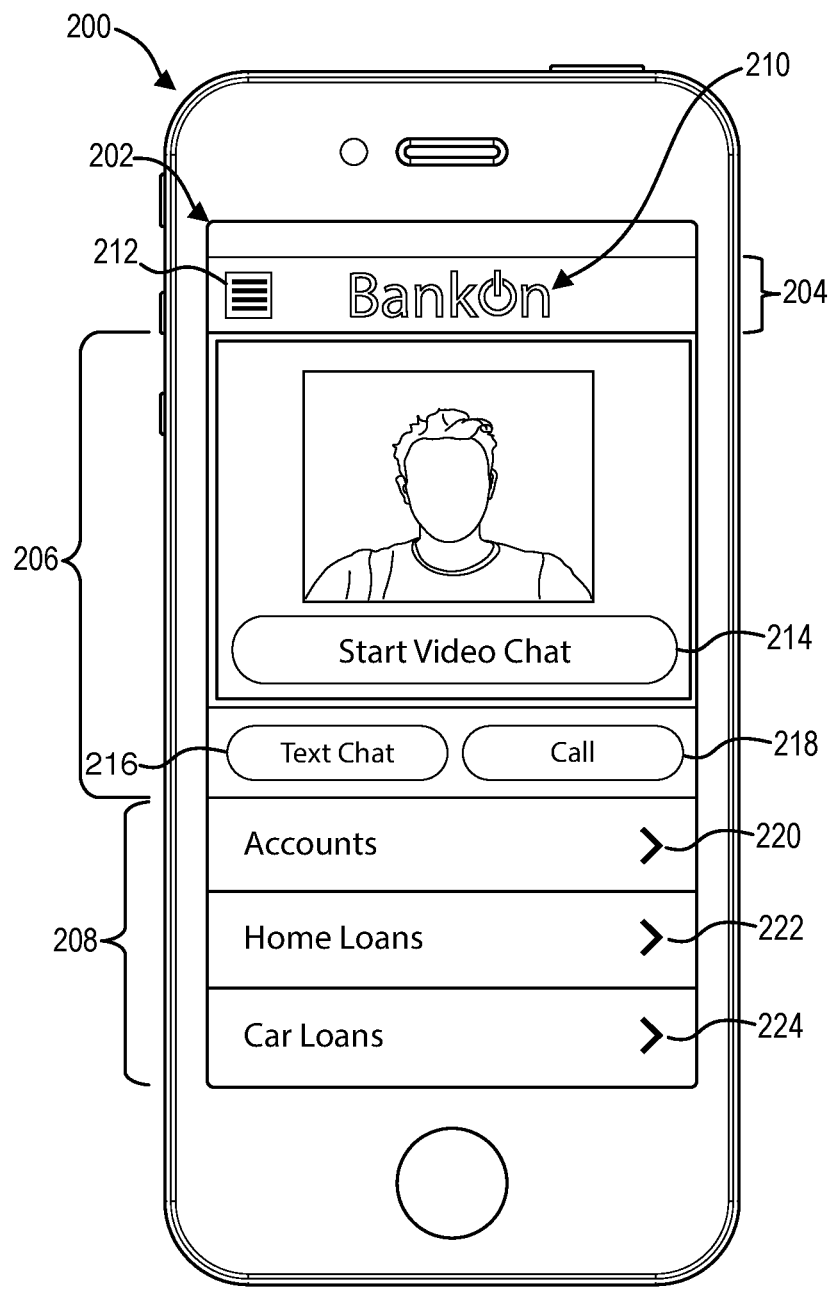
FIG. 2 illustrates a mobile device displaying an application user interface operable to enable a mobile device user to interact with a mobile application in accordance with one or more embodiments.

FIG. 2 illustrates a mobile device 200 displaying an application user interface 202 operable to allow the mobile device user 114 to interact with the mobile application in accordance with one or more embodiments. The application user interface 202 includes a heading portion 204, a customer support portion 206, and a navigation portion 208. In alternate embodiments, the application user interface 202 may include any other portions relevant to the mobile application.

Heading portion 204 of application user interface 202 provides general information and options for the user 114. FIG. 2 illustrates header portion 204 providing a title 210 and a menu 212. The title 210 provides the title of the business but may alternatively provide the name of the mobile application or any other title deemed sufficient for the purposes of the mobile application. The menu 212 provides a drop down menu with pre-selected options for interacting with the mobile application. For example, the drop down menu provides the user 114 with an option of logging into a user account or navigating to a home page of the mobile application. In one or more alternative embodiments, menu 212 may be replaced with links in the header portion 204 providing the user 114 with similar options.

Customer support portion 206 an option to contact a support representative 112 to receive assistance. For example, a user who is unfamiliar with a mobile application may need assistance in finding information or performing a desired function. By way of illustration, in the context of a mobile banking application, the user may require help in finding account balances, performing a check deposit, making a credit card payment, or interacting with the mobile application in another way.

As illustrated in FIG. 2, the customer support portion 206 includes multiple selectable buttons the user 114 can select to contact a support representative 112. For example, the customer support portion 206 of FIG. 2 includes a video chat button 214, a text chat button 216, and a phone call button 218, which the mobile application may use to initiate a video chat, a text chat, or a phone call respectively. In response to a selection, the mobile device 200 sends a request to initiate a communications session of the type associated with the button. For example, by selecting the video chat button 214, the mobile device 200 sends a request to begin a video chat session with the support representative 112.

Alternatively, the customer support portion 206 may include other selectable buttons to contact the support representative 112, such as an option to e-mail or send a voice-recorded message. It will also be appreciated that any number of selectable buttons may be present in the customer support portion 206 in any combination. To illustrate, the customer support portion 206 may include selectable buttons for video chat, text chat, phone call, and email message, or the customer support portion 206 may only include the video chat button 214.

The navigation portion 208 presents the user 114 with quick navigational options. For example, the navigation portion 208 of FIG. 2 presents options to navigate to a page comprising information on accounts 220, information on home loans 222, or information on car loans 224. In one or more embodiments, other options deemed useful to the user 114 may also be present.

Figure 3:
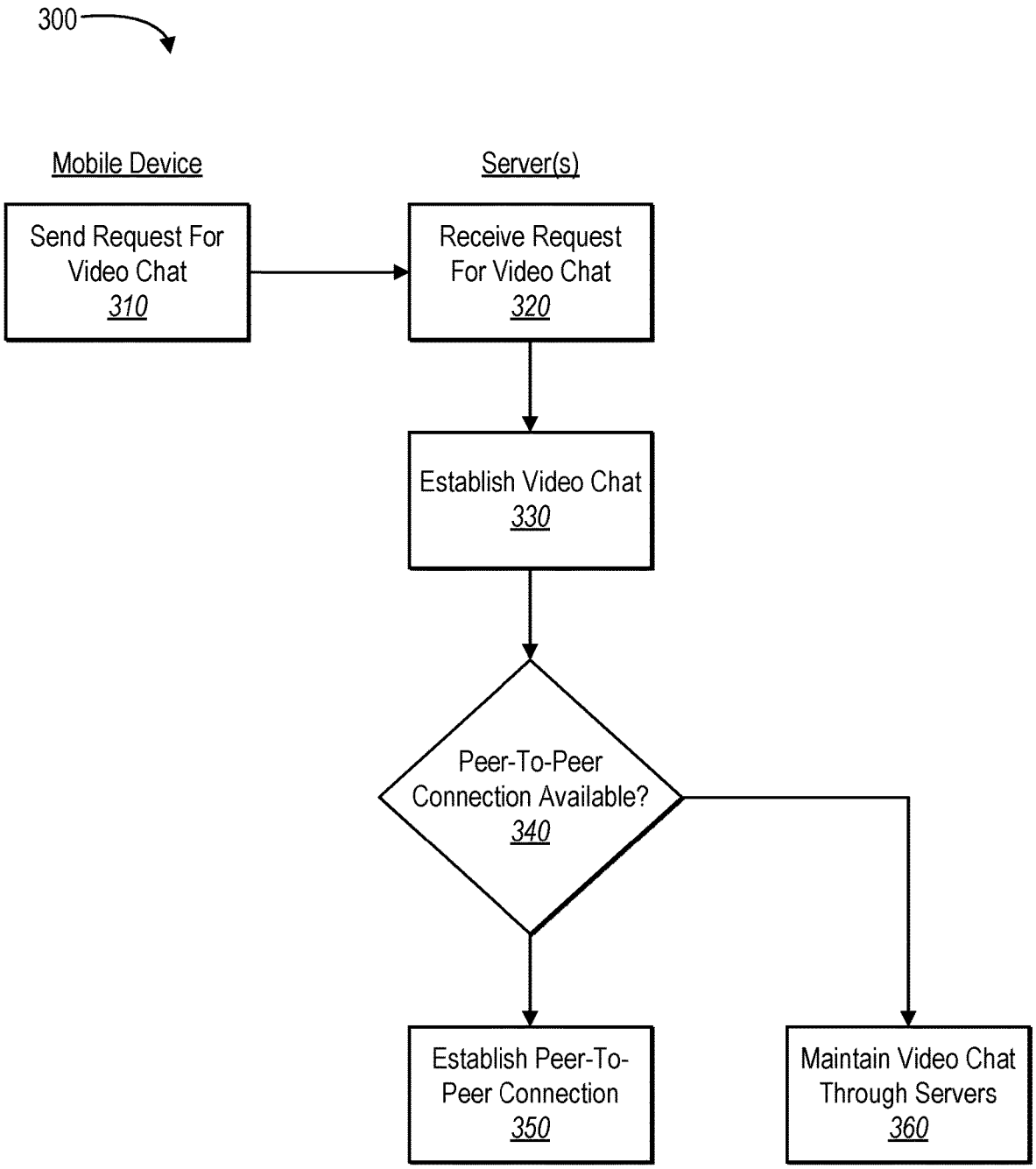
FIG. 3 illustrates a flowchart of a series of acts in a method of initiating a video chat connection between a mobile device and a support terminal in accordance with one or more embodiments.

As mentioned previously, one or more embodiments include a video chat between a mobile device 104, 200 and a support terminal 102. FIG. 3 illustrates a flowchart of a series of acts in a method 300 of initiating a video chat connection between a mobile device 104, 200 and a support terminal 102 in accordance with one or more embodiments. The method 300 is performed in a hardware environment that includes the system 100. The method 300 is intended to be illustrative of one or more methods in accordance with the present disclosure, and is not intended to limit potential embodiments. Alternative embodiments can include additional, fewer, or different steps than those articulated in FIG. 3.

As illustrated in FIG. 3, the method 300 includes an act 310 of sending, from a mobile device 104, 200, a request to initiate a video chat. The request can initially be processed by a series of one or more servers, such as the communication server(s) 106 of FIG. 1. As discussed above, the communication server(s) 106 may contain a load balance server, a signaling server, and a STUN/TURN server. Alternatively, the request may be sent through a single server that performs the same functionality as the combination of servers. In particular, the act 310 includes sending a request from the mobile device 104, 200 to initiate a video chat between the mobile device 104, 200 and a support terminal 102.

Moreover, as illustrated in FIG. 3, the method 300 also includes an act 320 of a receiving the request to initiate a video chat. Furthermore, FIG. 3 illustrates that the method 300 also includes an act 330 of establishing a video chat between the mobile device and a support terminal. In particular, the act 330 comprises establishing a first connection between the mobile device and the support terminal, and conducting a video chat transmitted across the first connection. In particular, the first connection can comprise a connection established through the communication server(s) 106.

As shown in FIG. 3, the method 300 also includes the act 340 of determining whether a peer-to-peer connection is available between the mobile device 104, 200 and the support terminal 102. In response to determining that a peer-to-peer connection is available, the method 300 proceeds to the act 350 of establishing a peer-to-peer connection between the mobile device 104, 200 and the support terminal 102. In particular, the act 350 switches the video chat from being conducted via a communication connection through the communication server(s) 106 to a peer-to-peer connection. In one or more embodiments, the act 350 may include severing the connection through communication server(s) 106 after the peer-to-peer connection has been established between the mobile device 104, 200 and the support terminal 102. One will appreciate in light of the disclosure herein that the use of a peer-to-peer connection to conduct the video chat can reduce system resources need for the video chat, provide greater flexibility, and in some cases allow for quicker communication between the mobile device 104, 200 and the support terminal 102.

Alternatively, in response to determining that a peer-to-peer connection is not available, the method 300 proceeds to the act 360 of maintaining the video chat through the communication server(s) 106. In one or more embodiments, the video chat may be maintained through the series of servers whether or not a peer-to-peer connection is available.

Figure 4:
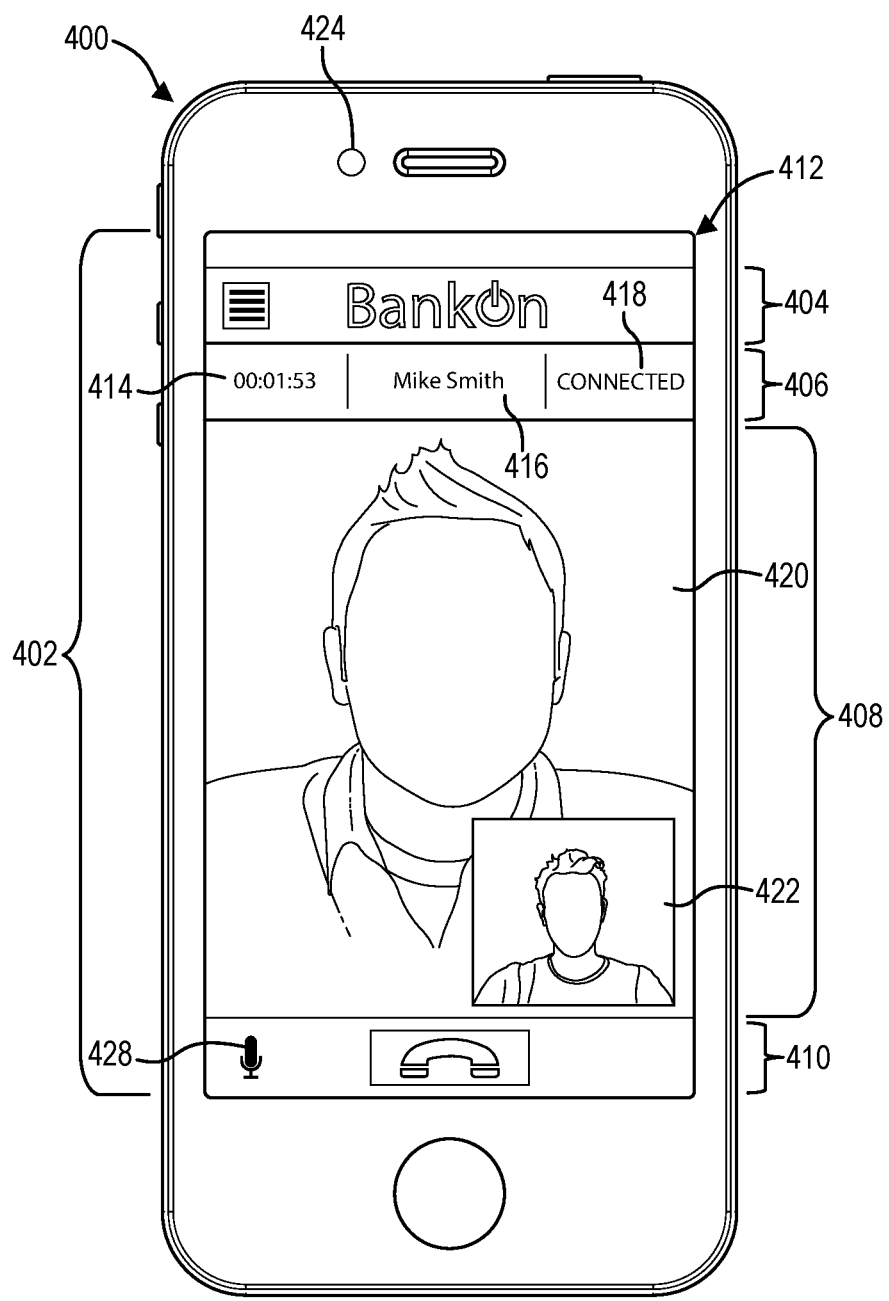
FIG. 4 illustrates a mobile device displaying a video chat interface in accordance with one or more embodiments.

FIG. 4 illustrates a mobile device 400 displaying a video chat interface 402 after a video chat has been established between a mobile device and a support terminal. The video chat interface 402 includes a heading portion 404, a session information portion 406, a video chat display portion 408, and a session control portion 410. As illustrated in FIG. 4, the video chat interface 402 utilizes the entirety of the mobile device display screen 412. In one or more alternative embodiments, the video chat interface utilizes less than the entirety of the mobile device display screen 412 in response to receiving a default display element (not shown) from a support terminal immediately after the video chat is established.

As illustrated in FIG. 4, the session information portion 406 of the video chat interface 402 displays information regarding the video chat session conducted between the mobile device and the support terminal. In particular, the session information portion 406 includes a time-keeping portion 414, a support representative identity portion 416, and a connection status portion 418. The time-keeping portion 414 displays the duration of the current video chat session. The support representative identity portion 416 displays the name of the support representative engaging in the video chat session. The connection status portion 418 displays the status of the connection between the mobile device and the support terminal. In one or more embodiments, the connection status portion 418 can indicate whether the video chat is being conducted via a peer-to-peer connection or not.

As illustrated in FIG. 4, the video chat display portion 408 includes a support representative display 420 and a mobile device user display 422. In particular, the support representative display 420 displays video content captured by the support terminal. The mobile device user display 422 displays video content captured by a camera 424 of the mobile device 400. As shown in FIG. 4, mobile device user display 422 is displayed in a lower right corner of the video chat display portion 408. Alternatively, the mobile device user display 422 may be displayed in any other location of the video display portion 408. In one or more embodiments, the mobile device user display 422 may be relocated to any location in response to detecting a user interaction. For example, a user may select and, with a dragging motion, relocate the mobile device user display 422 to any other location.

As further illustrated in FIG. 4, the session control portion 410 of the video chat interface 402 includes a session end option 426 and a microphone mute option 428. Alternatively, one or more embodiments may include other options, such as a record option to record the audio content, visual content, or both from the video chat session.

Once a video chat established between the mobile device and the support terminal, the support representative may desire to send a display element to the user of the mobile device. FIGS. 5A-5F provide various exemplary embodiments of a mobile device 500 displaying a dual pane display 502 in response to receiving a display element 504a-504f from a support terminal. In particular, as part of receiving the display element, the mobile device 500 receives a trigger that causes the mobile device 500 to initiate the dual pane display. The trigger can comprise a piece of JavaScript or other code, that when received by the mobile device, causes the mobile device to split the display into multiple panes. More specifically, the trigger can cause the mobile device 500 to execute code previously installed on the mobile device 500 as part of the mobile application. Such code can cause the mobile device 500 to provide multiple panes as described hereinafter.

As illustrated in FIGS. 5A-5F, the mobile devices 500 divides the mobile device display screen 506 into a first pane 508 and a second pane 510 (in alternative embodiments there may be more than 2 panes). As illustrated, the mobile devices provides the video chat in the first pane 508 and the display element 504a-5f in the second pane 510. Alternatively, the mobile device 600 may divide the display screen 506 into three or more panes in response to receiving multiple display elements simultaneously or in response to receiving a display element formatted to use multiple panes.

In one or more embodiments, a mobile device user may choose to accept or reject the display element before it is displayed in the second pane 510. For example, in response to receiving a display element 504a-504f and the accompanying trigger, the display screen 506 may divide into a first pane 508 and a second pane 506. A screen may be subsequently provided in the second pane 510, displaying selectable options to the user of the mobile device 500 to either accept or reject the display element. The display element 504a-504f will display in the second pane 510 only when the user selects to accept it. Otherwise, if the user chooses to reject the display element 504a-504f, the first pane 508 and the second pane 510 may converge back into a single display (such as that shown in FIG. 4).

Additionally, the mobile device 500 may modify the size of the first pane 508 and the second pane 510 on the display screen 506 or of any other panes based on the display element received. For example, the display element received may require more than half of the display screen 506. As a result, the display screen 506 will divide into a first pane 508 and a second pane 510, wherein the first pane 510 fills the majority of the display space of the display screen 506 and the first pane 508 fills the remaining space available.

In one or more embodiments, a mobile device user may modify the display elements 504a-504f. Alternatively, a display element may be static and only meant for viewing. In one or more embodiments, providing and modifying a display element 504a-504f may occur independent of any interaction with the video chat provided in the first pane 508.

Figure 5A:
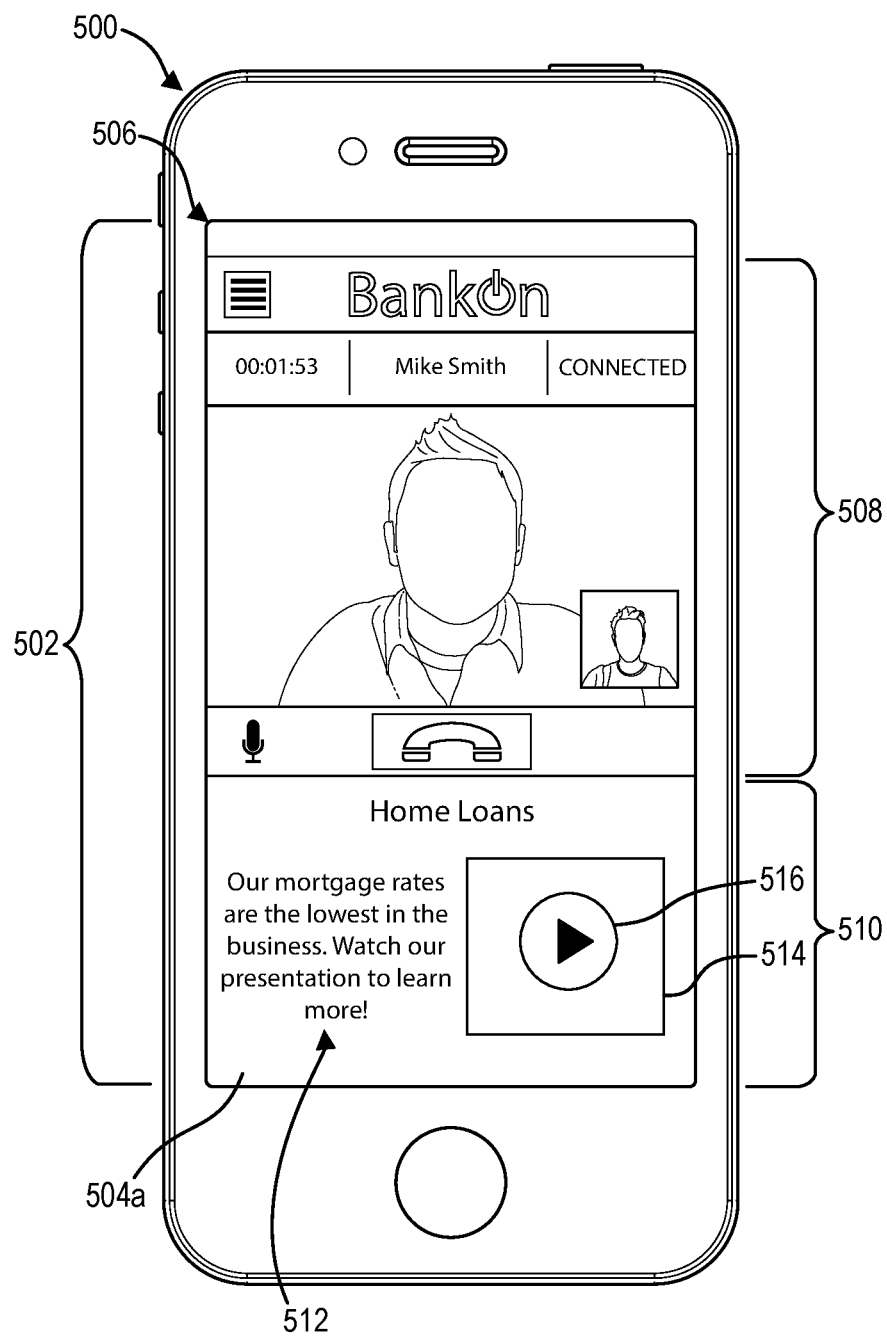
FIG. 5A illustrates a mobile device displaying a dual pane display with a display element in accordance with one or more embodiments.

The display element 504a illustrated in FIG. 5A is an informational slide comprising a text portion 512 and a video portion 514. The display element 504a provides exemplary information regarding a banking service provided by the mobile application. By way of illustration, the display element 504a displays information regarding mortgage rates.

The video portion 514 plays an informational video in response to a user interaction. For example, the video portion 514 plays the video in response to detecting a user selection of a play button 516. Additionally, or alternatively, the video portion 514 may play the video in response to detecting a user swiping gesture or a user voice command. Alternatively, the video portion 514 may play the video immediately after the display element 504a is displayed on the second pane 510. One or more alternative embodiments may comprise an informational display element comprising only an informational slide or document or only an informational video. Additionally, or alternatively, the informational slide can comprise images separate from or in addition to any informational text.

Figure 5B:
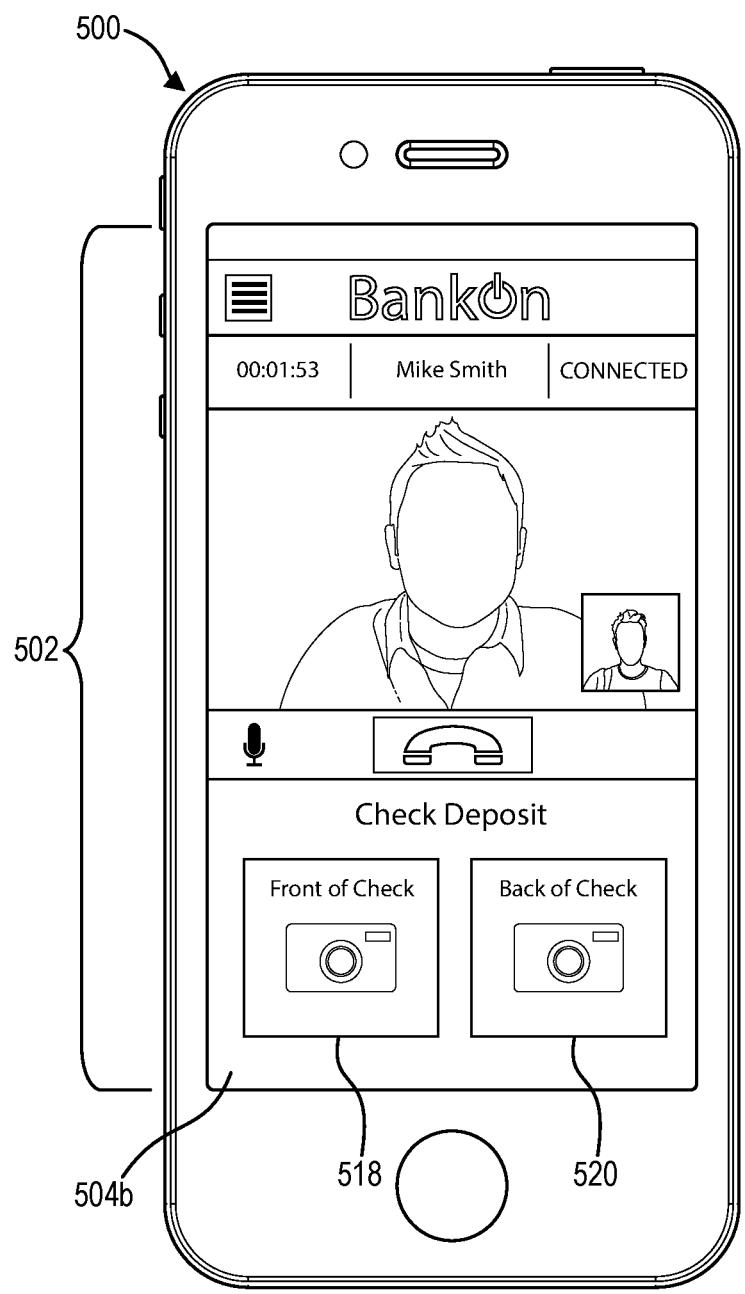
FIG. 5B illustrates a mobile device displaying a dual pane display with another display element in accordance with one or more embodiments.

FIG. 5B illustrates another embodiment of the mobile device 500 displaying a dual pane display 502. In particular, the mobile device 500 provides a display element 504b in the second pane 510 with an interface for capturing multiple images for check deposit. In particular, display element 504b comprises a first button 518 and a second button 520, wherein the first button designates a captured image as a front view of a check and the second button 520 designates a captured image as a back view of a check. Upon detecting a user selection of the first button 518 or the second button 520, the video chat provided in the first pane 508 overlays the display of the video chat with a viewfinder display (not shown), wherein the viewfinder display provides a representation of image data captured by a camera (camera on back of device not shown) of the mobile device 500. Alternatively, when mobile device 500 receives display element 504b, it may also receive a camera trigger that immediately activates the camera and overlays the video chat in the first pane 508 with the viewfinder display.

While the first pane 508 provides the viewfinder mode, the video chat may be continuously received by the mobile device 500. Alternatively, the visual data from the video chat may temporarily cut off until a user indicates that capturing images is done. Additionally, or alternatively, the audio from the video chat transmission is still available while the mobile device user captures the images, so that the support representative may guide the mobile device user through the process.

An image of the check captured by the mobile device 500 is automatically sent to the support terminal for verification and check deposit. Alternatively, in one or more embodiments, the display element 504b may include an additional button for sending an image file that has been captured to the satisfaction of the mobile device user.

One skilled in the art will appreciate that display element 504b may function to capture images of documents other than checks and that FIG. 5B is provided only as an illustration. For example, in one or more embodiments, the display element 504b may enable a user to capture an image of a contract, identification, or any other document that may be required by the support representative.

Figure 5C:
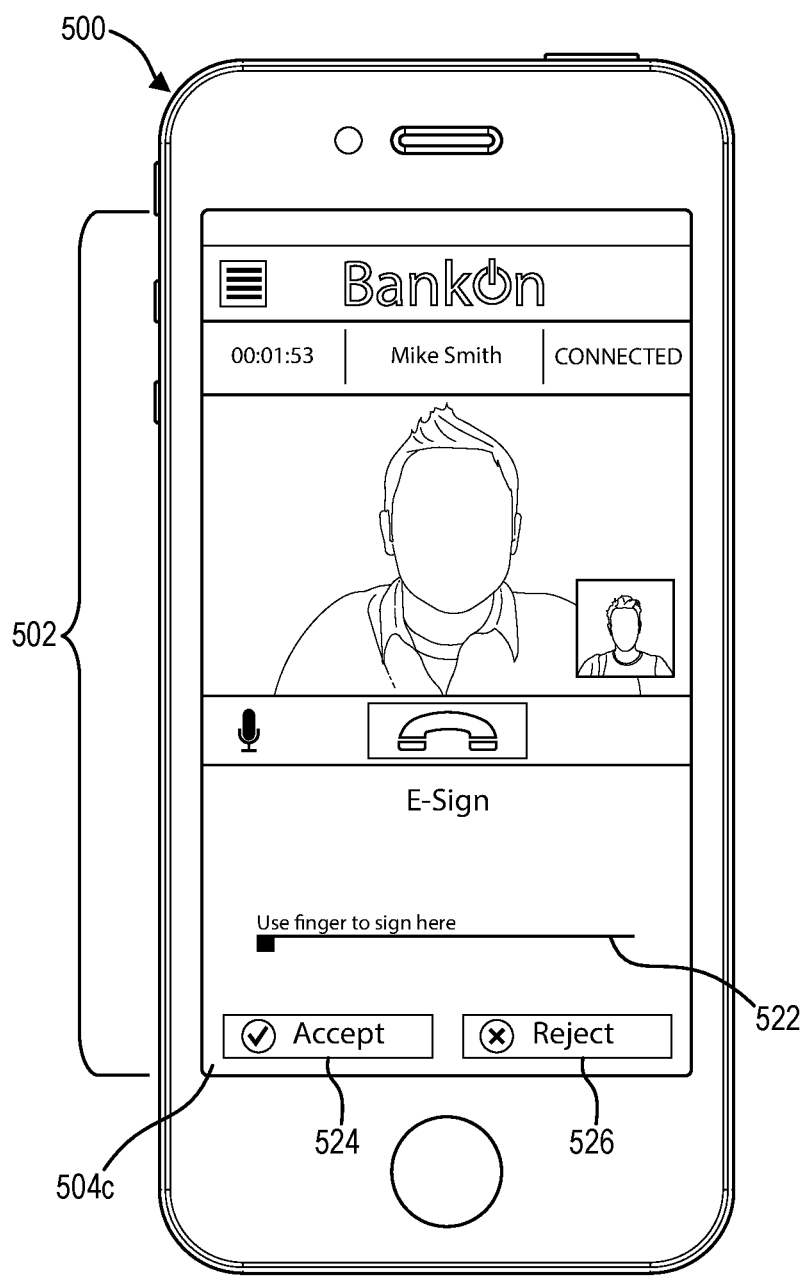
FIG. 5C illustrates a mobile device displaying a dual pane display with yet another display element in accordance with one or more embodiments.

FIG. 5C illustrates yet another embodiment of the mobile device 500 displaying a dual pane display 502. In particular, the mobile device 500 provides a display element 504c in the second pane 510 that is a signature pad enabling a user to enter a signature. In particular, the display element 504c comprises a signature line 522, an accept button 524, and a reject button 526. The display element 504c changes, in response to detecting a user interaction along the signature line 522, a signature of the mobile device user. For example, a user may use a finger or a stylus to enter a signature upon the signature line 522. After entering the signature, the mobile device user may select to accept or reject the signature. Upon detecting a selection of the accept button 524, the signature is sent to the support terminal. Upon detecting a selection of the reject button 526, the signature line 522 is cleared for the mobile device user to sign again.

Figure 5D:
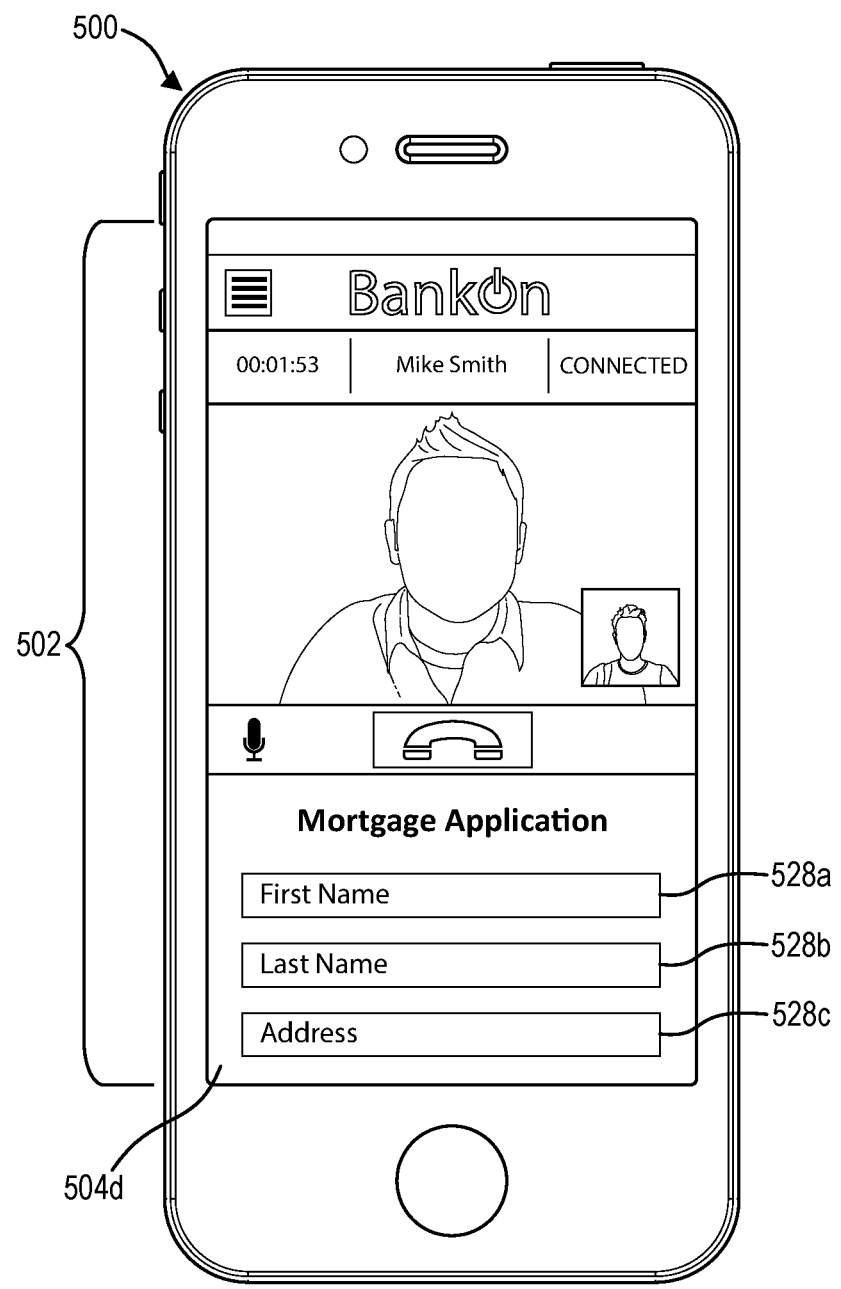
FIG. 5D illustrates a mobile device displaying a dual pane display with yet another display element in accordance with one or more embodiments.

FIG. 5D illustrates yet another embodiment of the mobile device 500 displaying a dual pane display 502. In particular, the mobile device 500 provides a display element 504d in the second pane 510 that is a fillable form that enables the mobile device enter input into the form. In particular, the display element 504d comprises fillable lines 528a-528c. By way of illustration, fillable lines 528a-528c instruct a user to input a first name, a last name, and an address, respectively; but it will be appreciated that the display element 504d may instruct a user to input other types of information as well. For example, the display element 504d may ask for a user's birthday, state of residence, or driver's license number.

Upon detecting a user selection of one of fillable lines 528a-528c, the display element 504d presents the mobile device user with an alphanumeric keypad for entering information into the corresponding line. Additionally, or alternatively, display element 504d may present the user with a list of optional inputs where there are a limited number of inputs available or acceptable. For example, if a fillable line instructed a user to input a state of residence, upon selecting that fillable line to input the information, the display element 504d may present the user with a list of states that may be chosen for input. Additionally, or alternatively, the display element 504d may accept information through voice command, wherein the user may vocally input the information requested.

It will also be appreciated by one of skill in the art that the fillable form of the display element 504d may require information in addition to what may be displayed on a single pane. Therefore, in one or more embodiments, the display element 504d may be scrollable, wherein a user may scroll in a direction of information or fillable lines in addition to those currently presented so the additional fillable lines may be viewed and interacted with to enter information. Alternatively, the display element 504d may provide a fillable form on multiple pages and present a user with button options to view a subsequent or previous page of fillable lines and information.

Figure 5E:
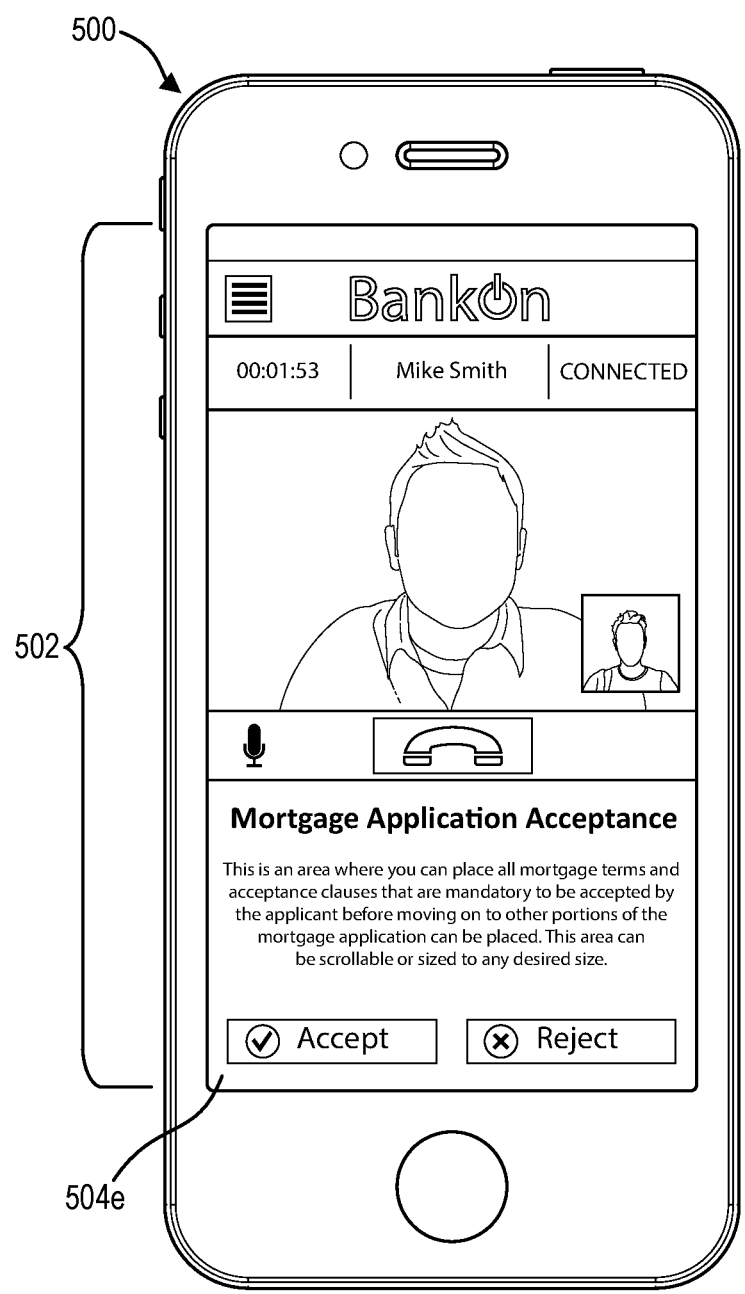
FIG. 5E illustrates a mobile device displaying a dual pane display with yet another display element in accordance with one or more embodiments.

FIG. 5E illustrates yet another embodiment of the mobile device 500 displaying a dual pane display 502. In particular, the mobile device 500 provides a display element 504e in the second pane 510 comprises terms and acceptance clauses accompanied by an option to accept or reject the terms.

Figure 5F:
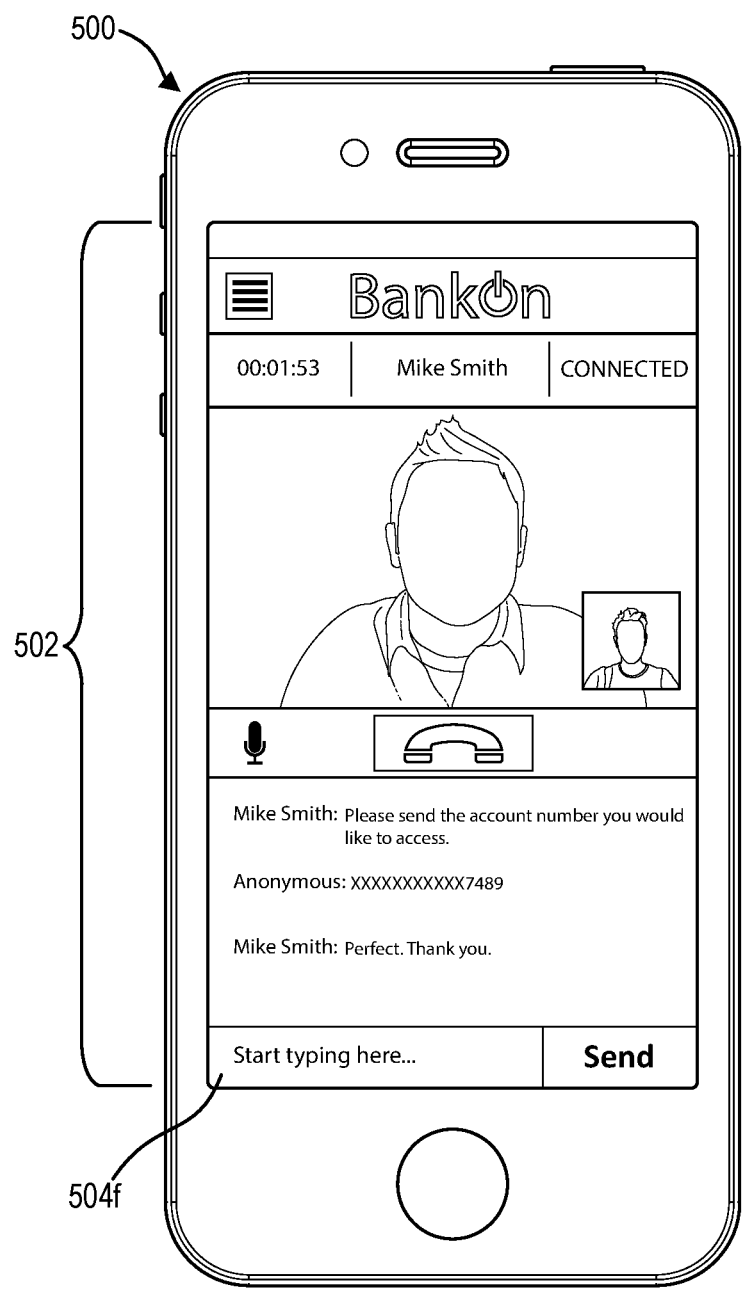
FIG. 5F illustrates a mobile device displaying a dual pane display with yet another display element in accordance with one or more embodiments.

FIG. 5F illustrates yet another embodiment of the mobile device 500 displaying a dual pane display 502. In particular, the mobile device 500 provides a display element 504f in the second pane 510 is a text-based messaging interface enabling a user to enter in and send a text-based message to a support terminal. Additionally, the display element 504f may receive and display text-based messages from the support terminal.

It will be appreciated by one skilled in the art that a display element may comprise elements of the display elements 504a-504f individually or in combination with one or more other display elements. For example, in one or more embodiment the support terminal can generate and send a computer-readable code, such as a bar code or a Quick Response Code. The computer-readable code, when scanned, can cause another device to perform an action. For example, the computer-readable code, when scanned by an ATM, can cause the ATM to disperse a predetermined amount of funds.

It will also be appreciated, as discussed above, that a display element may comprise more information or modifiable elements than can be presented on a single pane.

Therefore, in one or more embodiments, the display elements 504a-504f may be scrollable, wherein a user may scroll in a direction where information or modifiable elements in addition to those currently presented may be viewed and interacted with to enter information. Alternatively, the display elements 504a-504f may provide information or interactive elements on multiple pages and present a user with button options to view a subsequent or previous page.

FIG. 6 illustrates an example implementation of a communications system 600 (or simply "system 600") used to send a modified display element or another replay to a display element. As illustrated in FIG. 6 the system 600 comprises a mobile device 602, a server 604, a database repository 606, a Websocket server 608, and a support terminal 610.

The system 600 establishes a connection between the mobile device 602 and the database repository 606 through the server 604. The connection is a third connection in addition to the first and second connections discussed with respect to the system 100 of FIG. 1. The server 604 enables the mobile device 602 to securely transmit a modified display element to the database repository 606. As illustrated in FIG. 6, the server 604 is a single server. Alternatively, the third connection may be made through a series of servers.

After receiving a modified display element, the server 604 forwards the modified display element to the database repository 606 and sends a notification to the support terminal 610 through the Websocket server 608. In one or more alternative embodiments, the notification may be sent to the support terminal directly from the mobile device 602. The notification indicates that the database repository 606 has received the modified display element and provides a location of the element within the database repository 606 so the support terminal 610 may grab the modified element. Additionally, or alternatively, the notification may include a link to the location of the modified display element, enabling the support terminal 610 to quickly acquire the modified element.

The database repository 606 may comprise any service that allows for the deposit and retrieval of electronic files. For example, the database repository 606 may be an electronic drop box, email service, or other cloud-based technology that allows electronic file sharing.

As shown by FIG. 6, the system can utilize cloud hosting (i.e., the database can comprise one or more cloud based servers). This type of cloud hosting allows for flexibility and scalability. New instances of servers can be created quickly and efficiently to ensure the system scales the use of the application as adoption rates increase. Thus, embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
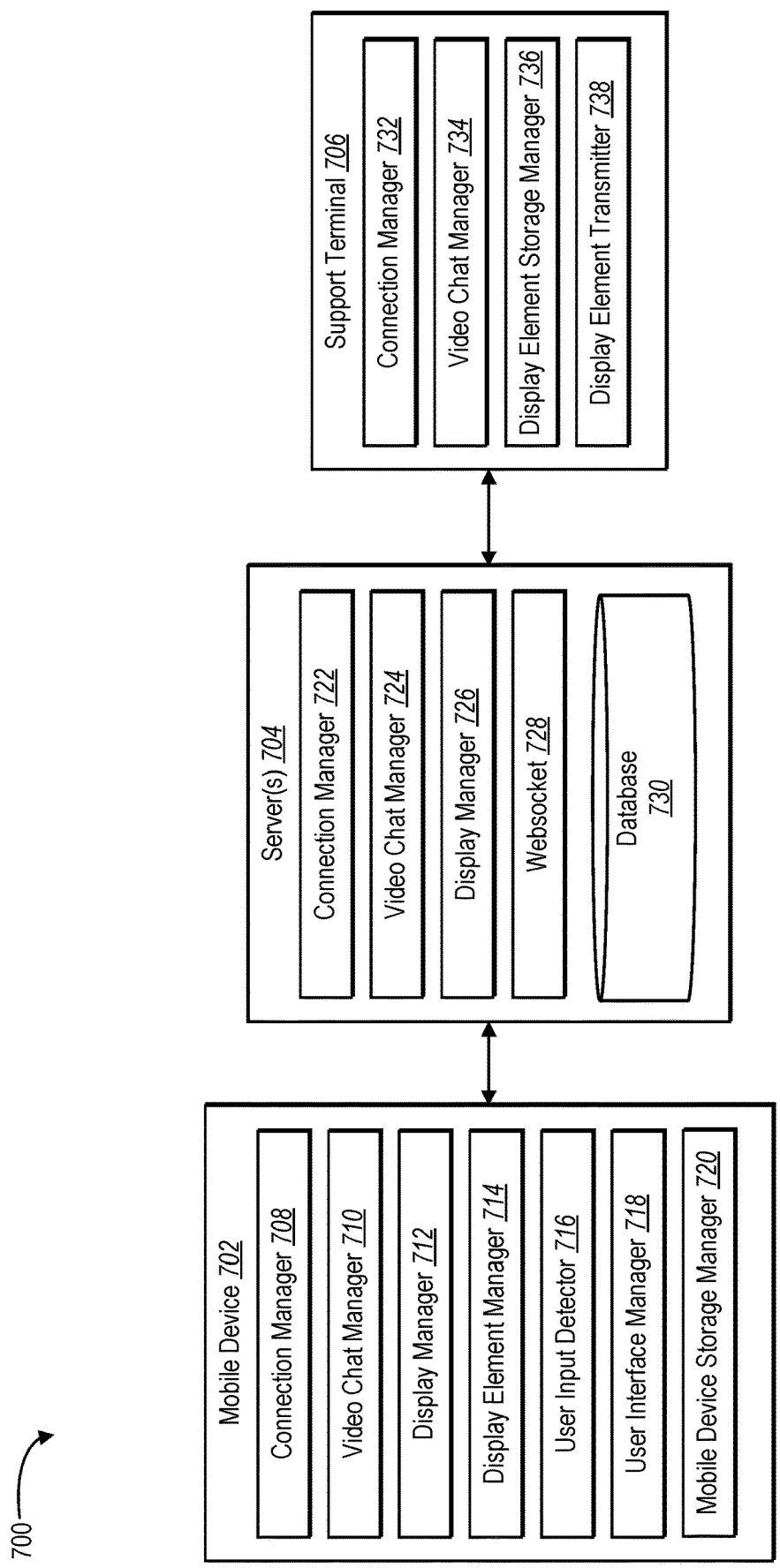
FIG. 7 illustrates a schematic diagram of a communications system in accordance with one or more embodiments.

Turning now to FIG. 7, additional detail will be provided regarding components and capabilities of one embodiment of the present invention comprising the communications system 100 as well as the communications system 600. In particular, FIG. 7 illustrates an embodiment of an exemplary system 700. As shown, the system 700 may include, but is not limited to, a mobile device 702, a server system 704, and a support terminal 706. Moreover, as shown, the mobile device 702 includes, but is not limited to, a connection manager 708, a video chat manager 710, a display manager 712, a display element manager 714, a user input detector 716, a user interface manager 718, and a mobile device storage manager 720. Additionally, as shown in FIG. 7, the server system 704 includes, but is not limited to, a connection manager 722, a video chat manager 724, a display manager 726, a Websocket 728, and a database repository 730. Furthermore, as shown in FIG. 7, the support terminal 706 includes, but is not limited to, a connection manager 732, a video chat manager 734, a display element storage manager 736, and a display element transmitter 738.

As just mentioned, and as illustrated in FIG. 7, the mobile device 702 includes the connection manager 708. The connection manager 708 searches for, detects, identifies, accepts, establishes, monitors, and maintains various types of connections. In particular, the connection manager 708 establishes and maintains one or more connections between the mobile device 702 and another device, such as the support terminal 706. For example, when establishing a video chat between the mobile device 702 and the support terminal 706, the connection manager 708 will establish and maintain a peer-to-peer connection through the duration of a video chat session.

As mentioned, and as illustrated in FIG. 7, the mobile device 702 also includes the video chat manager 710. The video chat manager 710 initiates, provides for display, and maintains a video chat between the mobile device 702 and another device, such as the support terminal 706. In particular, the video chat manager 710 operates in conjunction with the connection manager 708 to establish and maintain a video chat between the mobile device 702 and another device, such as a support terminal 706.

Additionally, the video chat manager 710 operates in conjunction with any number of user input/output devices, including, but not limited to cameras, microphones, display screens, touchscreens, and keypads.

As mentioned, and as illustrated in FIG. 7, the mobile device 702 also includes the display manager 712. The display manager 712 maintains and changes a display presented on the mobile device 702. In particular, the display manager 712 works in conjunction with the user input detector 716 to change a display of the mobile device in response to detecting a user interaction. Additionally, the display manager 712 works in conjunction with the user interface manager 718 to display a graphical user interface.

The display manager 712 also changes the display of the mobile device 702 in response to receiving triggering code through a connection to another device. For example, the display manager 712 may receive triggering code over a connection. In response to receiving the triggering code, the display manager 712 can divide the display of the mobile device 702 into multiple panes, enabling the mobile device

702 to display multiple display items within the multiple panes. As referred to herein, a "display item" refers to any visual component (e.g. character, image, video, or user interface) For example, the mobile device 702 may be able to display separate mobile applications in the multiple panes or the mobile device may display a video chat in one pane and a display element in another.

Additionally, the display manager 712 may modify the size of the multiple panes according to the needs of the items displayed within those panes. In particular, the display manager 712 may increase the size of a pane if the display item within the pane requires more display space.

As mentioned, and as illustrate in FIG. 7, the mobile device 702 also includes the display element manager 714. The display element manager 714 receives, sends, and provides for display elements. In particular, the display element manager operates in conjunction with the display manager 712 to display a display element on the mobile device 702.

Additionally, the display element manager 714 modifies and maintains display elements. In particular, the display element manager operates in conjunction with the user input detector 716 to detect a user input. In response to detecting a user input, the display element manager 714 modifies the display element in accordance to the particular user interaction.

As mentioned, and as illustrated in FIG. 7, the mobile device 702 also includes the user input detector 716. The user input detector 716 detects, identifies, monitors, receives, processes, captures, and/or records various types of user input. For example, the user input detector 716 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 716 operates in conjunction with any number of user input devices (in isolation or in combination), mouse devices, keyboards, track pads, or stylus devices. The user input detector 716 detects and identifies various types of user interactions with user input devices, such as select events, drag events, scroll events, and so forth. For example, the user input detector 716 detects one or more touch gestures (e.g., swipe gestures, tap gestures, pinch gestures, or reverse pinch gestures) from a user that forms a user interaction.

The user input detector 716 communicates with, and thus detects user input with respect to, a variety of programs, applications, plug-ins, operating systems, user interfaces, or other implementations in software or hardware.

As mentioned, and as illustrated in FIG. 7, the mobile device 702 also includes the user interface manager 718. The user interface manager 718 provides, manages, and/or controls a graphical user interface (or simply "user interface") for use with the system 700. In particular, the user interface manager 718 can facilitate presentation of information by way of an external component of the mobile device 702. For example, the user interface manager 718 can display a user interface by way of a display screen associated with the mobile device 702. The user interface may be composed of a plurality of graphical components, objects, and/or elements that allow a user to perform a function. The user interface manager 718 presents, via the mobile device 702, a variety of types of information, including text, images, video, audio, characters, or other information. Moreover, the user interface manager 718 provides a variety of user interfaces specific to any variety of functions, programs, applications, plug-ins, devices, operating systems, and/or components of the mobile device 702.

The user interface manager 718 can provide a user interface with regard to a variety of operations or applications. For example, the user interface manager 718 provides a user interface that facilitates selecting, identifying, searching, or downloading digital files. Similarly, the user interface manager 718 can generate a user interface that facilitates managing, editing, modifying, downloading, uploading, or sending digital images. Additional details with respect to various example user interface elements are described throughout with regard to various embodiments containing user interfaces.

In addition, as illustrated in FIG. 7, the mobile device 702 also includes the client device storage manager 720. The client device storage manager 720 maintains data for the system 700. The client device storage manager 722 can maintain data of any type, size, or kind, as necessary to perform the functions of the system 700.

Furthermore, as illustrated in FIG. 7, the server system 704 includes the connection manager 722. The connection manager 722 searches for, detects, identifies, accepts, establishes, monitors, and maintains various types of connections. In particular, the connection manager 722 establishes and maintains one or more connections between devices. For example, the connection manager 722 may establish a connection between the mobile device 702 and the support terminal 706.

As mentioned, and as illustrated in FIG. 7, the server system 704 also includes the video chat manager 724. The video chat manager 724 establishes, receives, transmits, and maintains a video chat between multiple devices. For example, the video chat manager 724 may establish and maintain a video chat between the mobile device 702 and another device, such as the support terminal 706. In particular, the video chat manager 724 operates in conjunction with the connection manager 722 to establish and maintain a video chat across a connection maintained by server system 704.

As mentioned, and as illustrated in FIG. 7, the server system 704 also includes the display manager 726. The display manager 726 receives and transmits items for display on devices. In particular, the display manager 726 can transmit items sent from one device to another device. For example, the display manager 726 can transmit a display element sent from the support terminal 706 to be displayed on the mobile device 702.

As mentioned, and as illustrated in FIG. 7, the server system 704 also includes the Websocket 728. The Websocket 728 is a bidirectional communication module that enables a device acting as a server to push data to a client device, rather than waiting for the client device to send a request for data, which the server then fills. In particular, the Websocket 728 operates in conjunction with the display manager 726 to enable a device acting as a server to push items for display to a device acting as a client. For example, the Websocket 728 and the display manager 726 work in conjunction to enable the support terminal 706 to push a display element for display to the mobile device 702.

As mentioned, and as illustrated in FIG. 7, the server system 704 also includes the database 730. The database 730 operates as a database repository to store data for retrieval. The database 730 can operate as an electronic cloud storage system (e.g. an electronic drop box). In particular, the database 730 stores data for retrieval from a device. For example, the database 730 can store a modified display element received from the mobile device 702 until it is overwritten or retrieved by the support terminal 706.

Furthermore, as illustrated in FIG. 7, the support terminal 706 includes the connection manager 732. The connection manager 732 searches for, detects, identifies, accepts, establishes, monitors, and maintains various types of connections. In particular, the connection manager 732 establishes and maintains one or more connections between the support terminal 706 and another device, such as the mobile device 702. For example, when establishing a video chat between the mobile device 702 and the support terminal 706, the connection manager 732 will establish and maintain a peer-to-peer connection through the duration of the video chat session.

As mentioned, and as illustrated in FIG. 7, the support terminal 706 also includes the video chat manager 734. The video chat manager 734 initiates, provides for display, and maintains a video chat between the support terminal and another device, such as the mobile device 702. In particular, the video chat manager 734 operates in conjunction with the connection manager 732 to establish and maintain a video chat between the support terminal 706 and another device, such as a mobile device 702.

Additionally, the video chat manager 732 operates in conjunction with any number of user input/output devices, including, but not limited to cameras, microphones, display screens, touchscreens, and keypads.

As mentioned, and as illustrated in FIG. 7, the support terminal 706 also includes the display element storage manager 736. The display element storage manager 736 stores display elements that may be selected and transmitted to another device, such as the mobile device 702. In particular, the display element storage manager 736 operates in conjunction with the display element transmitter 738 and the connection manager 732 to transmit a display element across a connection.

As mentioned, and as illustrated in FIG. 7, the support terminal 706 also includes the display element transmitter 738. The display element transmitter 738 operates to transmit a display element across a connection to another device.

Figure 8:
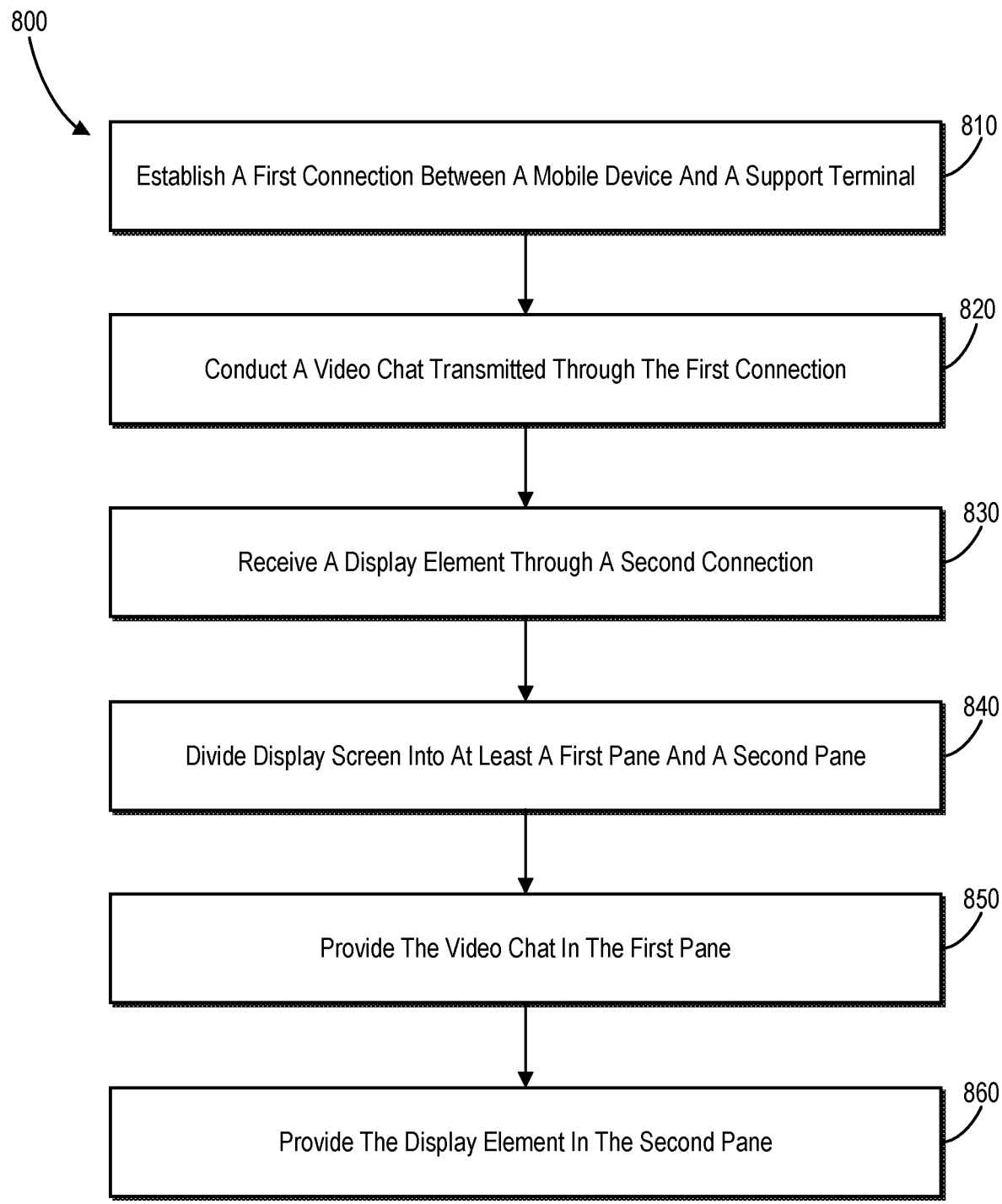
FIG. 8 illustrates a flowchart of a series of acts in a method of implementing a dual pane display in accordance with one or more embodiments.

FIG. 8 illustrates a flowchart of a series of acts in a method 800 of implementing a dual pane display on a mobile device in accordance with one or more embodiments of the present invention. As illustrated in FIG. 8, the 800 can include an act 810 of establishing a first connection between the mobile device and a support terminal. In particular, the act 810 can include sending a request for a video chat through a series of servers, establishing the first connection between the mobile device and the support terminal, establishing a peer-to-peer connection between the mobile device and the support terminal, and maintaining the first connection through the peer-to-peer connection. Alternatively, if a peer-to-peer connection is not available, the series of servers may maintain the first connection.

As shown in FIG. 8, the method 800 also includes an act 820 of conducting a video chat transmitted through the first connection. In particular, the act 820 conducts the video chat transmitted through the peer-to-peer connection. Alternatively, if the series of servers are maintaining the video chat, the act 820 conducts the video chat transmitted through the series of servers.

As shown in FIG. 8, the method 800 also includes an act 830 of receiving a display element through a second connection. The act 830 can include receiving a trigger through the second connection and executing, code stored on the mobile device, in response to receiving the trigger, to activate a capability of the mobile device. As referred to herein, a "capability" of a mobile device refers to a function of a mobile device that is available externally from the mobile application implementing method 800 (e.g. operating a camera or composing a text-based message). Additionally, the second connection of the act 830 can be a connection through a Web socket server.

As shown in FIG. 8, the method 800 also includes an act 840 of dividing a display screen of the mobile device into at least a first pane and a second pane. The act 840 can include receiving a trigger, along with receiving the display element in the act 830, and dividing the display screen in response. Alternatively, the act 840 may divide the display screen into more than two panes. For example, if multiple display elements are received simultaneously, the act 840 may divide the display screen into three or more panes.

As further shown in FIG. 8, the method 800 also includes an act 850 and an act 860, wherein the act 850 provides the video chat in the first pane and the act 860 provides the display element in the second pane. It will be appreciated, however, that both the video chat and the display element can be provided in any available pane just as effectively.

Figure 9:
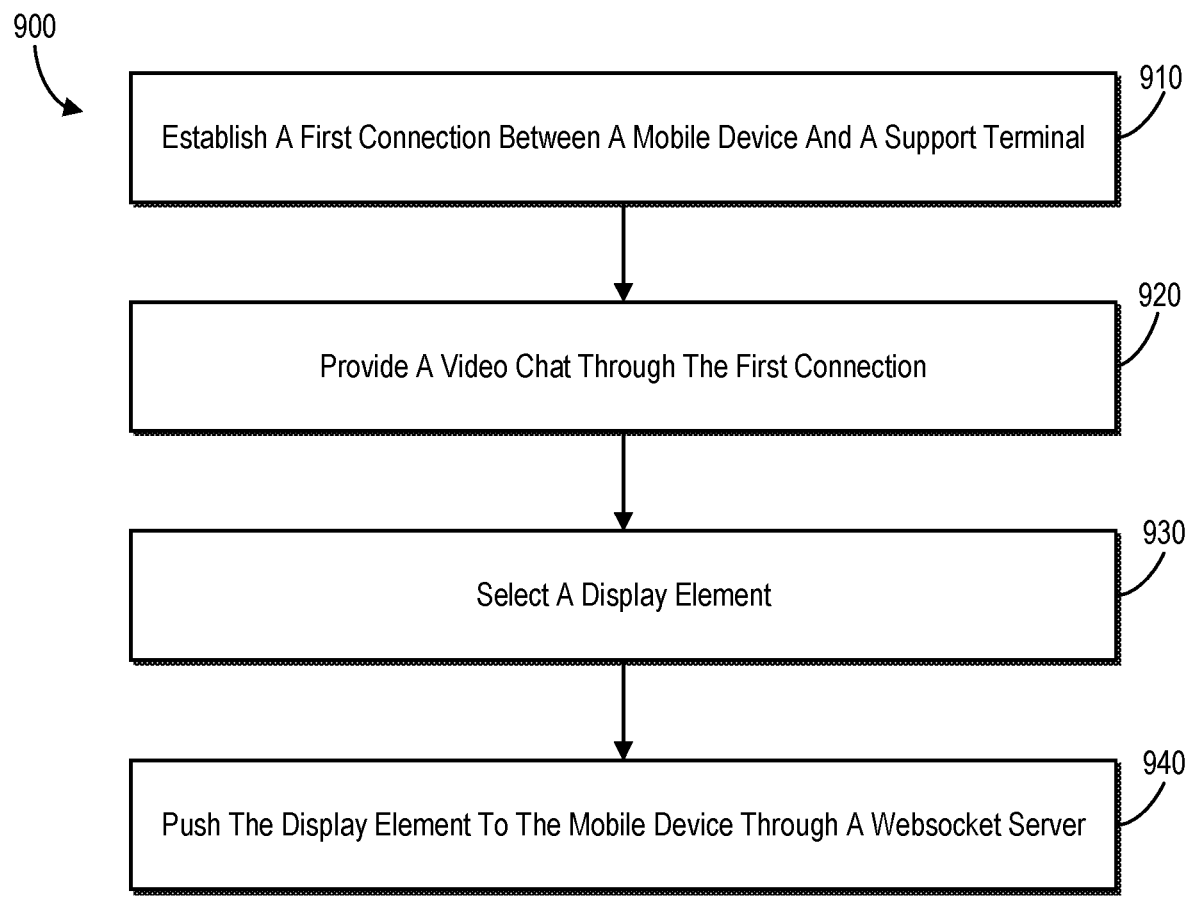
FIG. 9 illustrates a flowchart of series of acts in another method of implementing a dual pane display in accordance with one or more embodiments.

FIG. 9 illustrates a flowchart of series of acts in a method 900 of implementing a dual pane display on a support terminal in accordance with one or more embodiments. As illustrated in FIG. 9, the method 900 can include an act 910 of establishing a first connection between a mobile device and a support terminal. Mirroring the act 810 of FIG. 8, the act 910 can include receiving a request for a video chat through a series of servers, establishing the first connection between the mobile device and the support terminal, establishing a peer-to-peer connection between the mobile device and the support terminal, and maintaining the first connection through the peer-to-peer connection. Alternatively, if a peer-to-peer connection is not available, the series of servers may maintain the first connection.

As shown in FIG. 9, the act 900 also includes an act 920 of providing a video chat through the first connection. Similar to the act 820, the act 920 conducts the video chat transmitted through the peer-to-peer connection. Alternatively, if the series of servers are maintaining the video chat, the act 820 conducts the video chat transmitted through the series of servers.

As shown in FIG. 9, the act 900 also includes an act 930 of selecting a display element. The act 900 can include selecting a display element from a set of display elements stored on the support terminal.

Further, as shown in FIG. 9, the act 900 also includes an act 940 of pushing the display element to the mobile device through a Websocket server. In particular, the act 940 can include directly pushing a display element to the mobile device. Alternatively, the act 940 can include pushing a location of the display element to the mobile device, wherein the location can comprise a link to the database storing the mobile device. Additionally, or alternatively, the act 940 can include pushing a trigger to the mobile device to initiate code stored on the mobile device to activate a capability of the mobile device.

Thus, as described above, the system is a unique combination of interactive panes on a mobile or tablet device that can be changed dynamically through a web socket layer that is utilized to handle real time communication actions between a second pane and the support representative sending the changes to the second pane. Further, each second pane may change based on the action or function of a representative user interacting with a backend support center. Additionally, a first pane is continuously streaming audio and video to the mobile device during the interactions with the second pane.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 10:
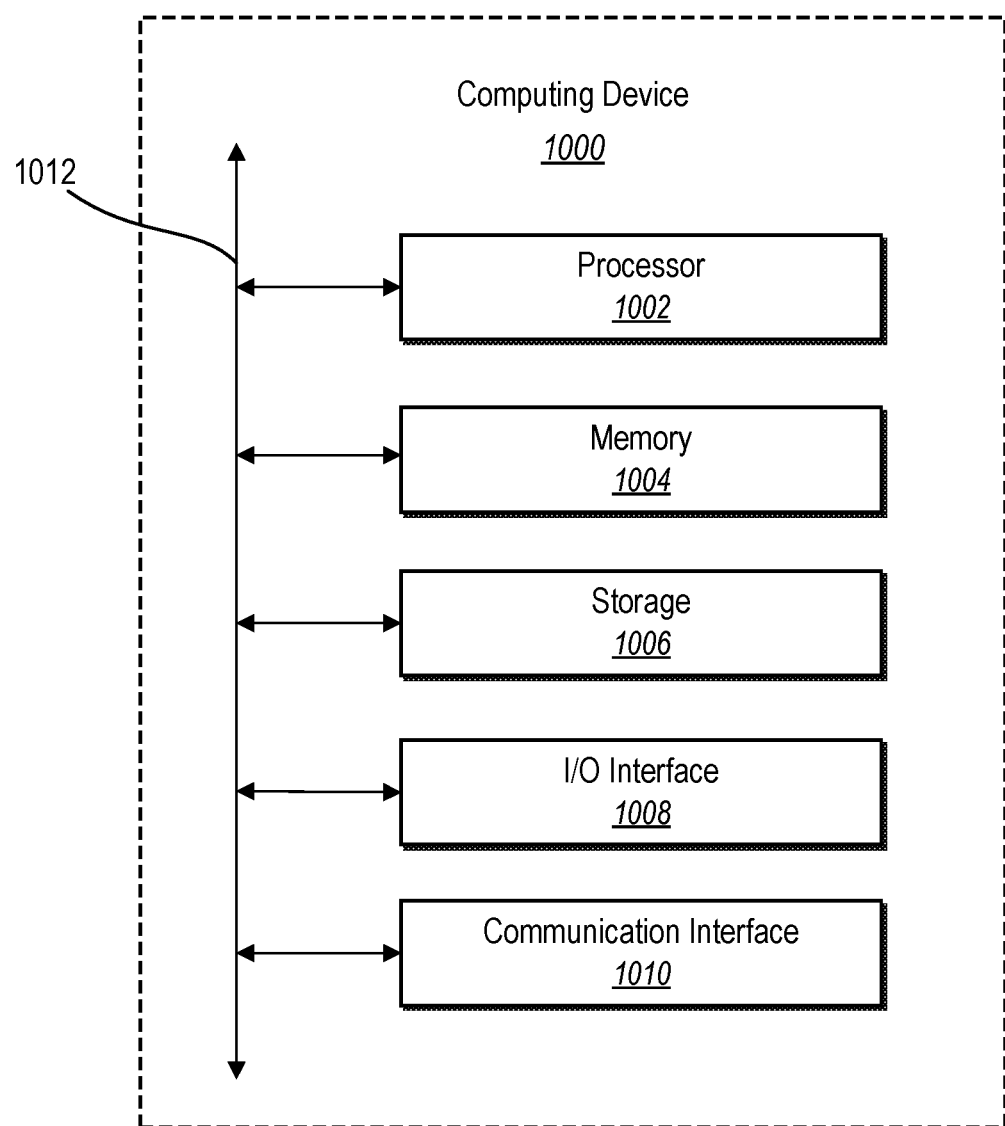
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the system 100 can comprise implementations of the computing device 1000. As shown by FIG. 10, the computing device 1000 can comprise a processor 1002, memory 1004, a storage device 1006, an I/O interface 1008, and a communication interface 1010. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them. In particular embodiments, processor(s) 1002 may include one or more internal caches for data, instructions, or addresses. As an example and not by way of limitation, processor(s) 1002 may include one or more instruction caches, one or more data caches, and one or more translation lookaside buffers (TLBs). Instructions in the instruction caches may be copies of instructions in memory 1004 or storage 1006.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In particular embodiments, storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1010. As an example and not by way of limitation, computing device 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1000 may include any suitable communication interface 1010 for any of these networks, where appropriate.

The computing device 1000 can further include a bus 1012. The bus 1012 can comprise hardware, software, or both that couples components of computing device 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:

establishing a first connection between a mobile device and a support terminal;

conducting a video chat between the mobile device and the support terminal transmitted through the first connection;

providing the video chat on a display screen of the mobile device;

receiving a remote storage location of a display element pushed through a second connection by the support terminal while providing the video chat on the display screen of the mobile device;

providing, on the display screen of the mobile device, a selectable option to accept the display element in response to receiving the remote storage location of the display element and during the video chat;

in response to receiving a user interaction with the selectable option to accept the display element and during the video chat, retrieving the display element from the remote storage location; and based on retrieving the display element from the remote storage location:
  providing the video chat in a first pane displayed on the display screen of the mobile device; and
  providing the display element in a second pane displayed on the display screen of the mobile device concurrently while providing the video chat in the first pane.

2. The method of claim 1, wherein establishing the first connection comprises sending a request for a video chat connection through a series of servers.

3. The method of claim 2, further comprising establishing a peer-to-peer connection, after the request for the video chat connection is received, and maintaining the first connection on the peer-to-peer connection.

4. The method of claim 1, further comprising modifying the display element upon detecting a user interaction with the display element while providing the video chat on the display screen of the mobile device, wherein providing and modifying the display element occurs independent of the video chat provided in the first pane.

5. The method of claim 4, wherein the user interaction comprises one or more of:
  entering input into a fillable form provided in the second pane;
  capturing an image of a check for deposit;
  sending a text-based message to the support terminal;
  signing a document provided in the second pane; or
  accepting or rejecting terms provided by the support terminal.

6. The method of claim 5, wherein capturing the image of the check for deposit comprises:
  overlaying the video chat provided in the first pane with a viewfinder mode that displays a representation of image data captured by a camera of the mobile device; and
  capturing a frontside image of the check and a backside image of the check.

7. The method of claim 5, further comprising sending a modified display element to a database repository through a third connection.

8. The method of claim 1, further comprising modifying a size of the first pane and a size of the second pane based on the display element received.

9. The method of claim 1, wherein:
receiving the remote storage location of the display element comprises receiving a link to a location of the display element within a remote database.

10. The method of claim 1, further comprising:
receiving a subsequent display element; and
providing the subsequent display element in the second pane as an overlay over a previous display element.

11. The method of claim 1, further comprising:
receiving a trigger pushed through the second connection by the support terminal; and
executing code stored on the mobile device, in response to receiving the trigger, to split the display screen into the first pane and the second pane.

12. The method of claim 1, wherein the display element comprises one or more of:
  a computer-readable code that when scanned by a computing device causes the computing device to perform a predetermined action;
  an informational video;
  an informational document;
  a signature pad;
  a fillable form;
  terms accompanied by an option to accept or reject the terms;
  an interface for capturing and sending images of a check; or
  a text-based messaging interface.

13. A method comprising:
establishing a first connection between a support terminal and a mobile device;
providing, for display on a display screen of the mobile device, a video chat between the support terminal and the mobile device transmitted through the first connection;
selecting a display element from the support terminal while providing the video chat for display on the display screen of the mobile device; and
pushing a remote storage location of the display element to the mobile device through a Websocket server for retrieval of the display element from the remote storage location and concurrent display of the display element with the video chat on the display screen of the mobile device in response to a user selection of a selectable option displayed at the mobile device to accept the display element.

14. The method of claim 13, further comprising pushing a trigger to the mobile device through the Websocket server, wherein the trigger initiates an execution of code stored on the mobile device to activate a capability of the mobile device.

15. The method of claim 13, further comprising pushing a default display element to the mobile device immediately after establishing the first connection.

16. The method of claim 13, further comprising receiving a signal through the Websocket server that a modified display element is stored in a database repository.

17. The method of claim 16, further comprising accessing the database repository and retrieving the modified display element.

18. A mobile device comprising:
a display screen;
at least one processor; and
at least one non-transitory computer-readable storage medium storing instructions that, when executed by the at least one processor causes the mobile device to;
establish a first connection between the mobile device and a support terminal;
conduct a video chat between the mobile device and the support terminal transmitted through the first connection;
provide the video chat on the display screen;
receive a remote storage location of a display element pushed through a second connection by the support terminal while providing the video chat on the display screen;
provide, on the display screen, a selectable option to accept the display element in response to receiving the remote storage location of the display element and during the video chat;
in response to receiving a user interaction with the selectable option to accept the display element and during the video chat, retrieve the display element from the remote storage location; and
based on retrieving the display element from the remote storage location:

provide the video chat in a first pane displayed on the display screen; and provide the display element in a second pane displayed on the display screen concurrently while providing the video chat in the first pane.

19. The method of claim 1, further comprising dividing the display screen of the mobile device into the first pane and the second pane in response to receiving the remote storage location of the display element and during the video chat, wherein providing the selectable option to accept the display element comprises providing the selectable option to accept the display element within the second pane concurrently while providing the video chat in the first pane.

20. The method of claim 1, further comprising:

receiving a remote storage location of a subsequent display element;

providing, on the display screen of the mobile device, a first selectable option to accept the subsequent display element and a second selectable option to reject the subsequent display element in response to receiving the remote storage location of the subsequent display element and during the video chat; and in response to receiving a user interaction with the second selectable option to reject the subsequent display element, merging the first pane and the second pane into a single pane displayed on the display screen of the mobile device.

* * * * *